(12) United States Patent
Kan et al.

(10) Patent No.: US 9,609,060 B2
(45) Date of Patent: Mar. 28, 2017

(54) DISTRIBUTED STORAGE SYSTEM AND METHOD

(75) Inventors: Masaki Kan, Tokyo (JP); Takashi Torii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 173 days.

(21) Appl. No.: 14/236,666

(22) PCT Filed: Jul. 31, 2012

(86) PCT No.: PCT/JP2012/069499
§ 371 (c)(1),
(2), (4) Date: Feb. 3, 2014

(87) PCT Pub. No.: WO2013/018808
PCT Pub. Date: Feb. 7, 2013

(65) Prior Publication Data
US 2014/0173035 A1    Jun. 19, 2014

(30) Foreign Application Priority Data

Aug. 2, 2011 (JP) ................................. 2011-169588

(51) Int. Cl.
*H04L 29/08* (2006.01)
*G06F 17/30* (2006.01)
(Continued)

(52) U.S. Cl.
CPC .......... *H04L 67/1097* (2013.01); *G06F 3/061* (2013.01); *G06F 3/065* (2013.01);
(Continued)

(58) Field of Classification Search
CPC ................. G06F 3/067; G06F 67/1097; G06F 17/30212; G06F 3/065; H04L 29/0854
See application file for complete search history.

(56) References Cited

U.S. PATENT DOCUMENTS 5,119,465 A * 6/1992 Jack .................. G06F 17/30569
707/E17.006
6,658,540 B1 * 12/2003 Sicola .................. G06F 11/2007
707/999.202

(Continued)

FOREIGN PATENT DOCUMENTS

| JP | 2002-197781 A | 7/2002 |
| JP | 3911810 B2 | 5/2007 |

(Continued)

OTHER PUBLICATIONS

International Search Report for PCT Application No. PCT/JP2012/069499, mailed on Sep. 4, 2012.

*Primary Examiner* — Lashonda Jacobs

(57) ABSTRACT

Provided a plurality of data nodes connected in a network, each including a data storage unit. The data node of data replication destination temporarily stores data to be updated in an intermediate data structure, and converts asynchronously with respect to the update request to a target data structure to store the converted data in the data storage unit. Based on access history information stored in an access history recording unit, trigger information, concerning timing for execution of conversion to the target data structure performed asynchronously by the data node is changed.

16 Claims, 16 Drawing Sheets

(51) Int. Cl.
*G06F 3/06* (2006.01)
*G06F 11/20* (2006.01)

(52) U.S. Cl.
CPC ............ *G06F 3/067* (2013.01); *G06F 3/0617* (2013.01); *G06F 17/30212* (2013.01); *H04L 67/1095* (2013.01); *H04L 67/2842* (2013.01); *G06F 11/2094* (2013.01); *H04L 29/0854* (2013.01)

(56) References Cited

U.S. PATENT DOCUMENTS

| | | | | |
|---|---|---|---|---|
| 7,689,602 | B1 * | 3/2010 | Sim-Tang | G06F 11/1448 707/673 |
| 7,925,749 | B1 * | 4/2011 | Lin | G06F 17/30215 709/215 |
| 8,006,111 | B1 * | 8/2011 | Faibish | G06F 1/3221 711/114 |
| 8,433,730 | B2 * | 4/2013 | Woods | G06F 17/3007 705/301 |
| 2002/0169928 | A1 * | 11/2002 | Kimura | G06F 1/3203 711/137 |
| 2006/0209678 | A1 * | 9/2006 | Vu | H04L 12/26 370/216 |
| 2006/0212625 | A1 * | 9/2006 | Nakagawa | G06F 3/0608 710/68 |
| 2007/0106712 | A1 * | 5/2007 | Yamato | G06F 11/2064 |
| 2007/0156842 | A1 | 7/2007 | Vermeulen et al. | |
| 2007/0185937 | A1 * | 8/2007 | Prahlad | G06F 17/30212 |
| 2007/0185938 | A1 * | 8/2007 | Prahlad | G06F 17/30212 |
| 2008/0034259 | A1 * | 2/2008 | Ko | G06F 11/1441 714/718 |
| 2008/0154914 | A1 | 6/2008 | Kan et al. | |
| 2010/0082555 | A1 * | 4/2010 | Ogawa | G06F 17/30144 707/688 |
| 2011/0320750 | A1 | 12/2011 | Kan et al. | |
| 2013/0041875 | A1 * | 2/2013 | Kan | G06F 3/0625 707/705 |
| 2013/0086124 | A1 * | 4/2013 | Bahl | G06F 17/30569 707/802 |
| 2013/0339295 | A1 * | 12/2013 | Dean | G06F 3/0611 707/610 |
| 2013/0346365 | A1 * | 12/2013 | Kan | G06F 3/061 707/610 |
| 2015/0186411 | A1 * | 7/2015 | Iliadis | H04L 67/1097 707/637 |
| 2015/0261468 | A1 * | 9/2015 | Khoyi | G06F 3/0619 711/114 |
| 2015/0269171 | A1 * | 9/2015 | Ebiyama | G06F 17/30433 707/803 |
| 2015/0324388 | A1 * | 11/2015 | Benke | G06F 3/0619 707/610 |

FOREIGN PATENT DOCUMENTS

| | | |
|---|---|---|
| JP | 2007-317017 A | 12/2007 |
| JP | 2009-522659 A | 6/2009 |
| JP | 2010-128752 A | 6/2010 |
| JP | 4528039 B2 | 8/2010 |
| WO | 2010/101189 A1 | 9/2010 |

* cited by examiner

FIG.3 B

| DATA STRUCTURE | TYPE OF DATA STORAGE SYSTEM |
|---|---|
| A | QUEUE |
| B | ROW STORE |
| C | COLUMN STORE |
| ... | ... |

FIG.3 A

| TABLE IDENTIFIER | REPLICA IDENTIFIER | DATA STRUCTURE | UPDATE TIMING |
|---|---|---|---|
| Stocks | 0 | B | 30 |
|  | 1 | B | 60 |
|  | 2 | C | 60 |
| WORKERS | 0 | B | 0 |
|  | 1 | B | 30 |
|  | 2 | C | 20 |
| Shops | 0 | A | 0 |
|  | 1 | B | 30 |
|  | 2 | C | 240 |
| Salary | 0 | B | 30 |
|  | 1 | B | 30 |
|  | 2 | C | 240 |

FIG.4 A

TABLE

| Key | value1 | value2 | value3 |
|-----|--------|--------|--------|
| K1a | v1a | v2a | v3a |
| K1b | v1b | v2b | v3b |
| K1c | v1c | v2c | v3c |
| K1d | v1d | v2d | v3d |
| ... | | | |

FIG.4 B

REPLICA IDENTIFIER : 0
DATA STRUCTURE B (ROW STORE)

| K1a,v1a,v2a,v3a |
| K1b,v1b,v2b,v3b |
| K1c,v1c,v2c,v3c |
| K1d,v1d,v2d,v3d |
| ... |

FIG.4 C

REPLICA IDENTIFIER : 1
DATA STRUCTURE B (ROW STORE)

| K1a,v1a,v2a,v3a |
| K1b,v1b,v2b,v3b |
| K1c,v1c,v2c,v3c |
| K1d,v1d,v2d,v3d |
| ... |

FIG.4 D

REPLICA IDENTIFIER : 2
DATA STRUCTURE C (COLUMN STORE)

| K1a,K1b,K1c,K1d, | V1a,v1b,v1c,v1d, | V2a,v2b,v2c,v2d, | V3a,v3b,v3c,v3d, |
|---|---|---|---|
| ... | ... | ... | ... |

FIG.5

| TABLE IDENTIFIER | REPLICA IDENTIFIER | DEPLOYMENT NODE |
|---|---|---|
| Stocks | 0 | 1 |
| | 1 | 2 |
| | 2 | 3 |
| WORKERS | 0 | 4 |
| | 1 | 1 |
| | 2 | 2 |
| Shops | 0 | 3 |
| | 1 | 4 |
| | 2 | 1 |
| Salary | 0 | 2 |
| | 1 | 3 |
| | 2 | 4 |

DISTRIBUTED STORAGE SYSTEM AND METHOD

CROSS-REFERENCE TO RELATED APPLICATIONS

The present application is a National Stage Entry of PCT/JP2012/069499 filed Jul. 31, 2012, which is based on and claims priority from Japanese Patent Application No. JP2011-169588 (filed on Aug. 2, 2011), the disclosures of all of which are incorporated herein in their entirety by reference.

TECHNICAL FIELD

The present invention relates to distributed storage, and in particular to a distributed storage system and method, in which control of data structures is possible.

BACKGROUND

There has been used a distributed storage system which implements a system in which a plurality of computers (referred to as data nodes or simply "nodes") are network-connected to utilize data stored in a data storage unit (HDD (Hard Disk Drive), memory or the like) of the respective computers.

In general distributed storage technology, decisions are implemented by software, special dedicated hardware or the like, concerning:

which computer (node) should data be disposed in, and which computer (node) should processing be performed on.

In a distributed storage system, an operation of the system is dynamically modified in accordance with a state of the system to adjust resource usage amount in the system, thereby improving performance for a system user (client computer).

In a distributed storage system, since data is dispersed in a plurality of nodes, a client that is going to access data has to know which node hold the data in question. When there are multiple nodes holding the data in question, the client that is going to access the data has to know which node (one and more) to access.

In a distributed storage system, with regard to file management, a scheme is generally used in which a file main body and meta data (storage location of the file, file size, owner and so forth) of the file in question are stored separately.

In a distributed storage system, a meta-server scheme is known as one technology for a client to identify a node holding the data. In the meta-server scheme, there is provided a meta-server configured by one or a plurality (but a small number) of computers to manage location information of data. However, in a distributed storage system of a meta-server scheme, with an increase in size of a system configuration, processing performance of the meta-server that performs processing to detect the location of a node holding the data is insufficient (the number of nodes managed by one meta-server becomes very large, and the processing performance of the meta-server in question cannot keep up), and there is a possibility of a bottleneck in access performance with regard to the meta-server that has been introduced.

<Distributed KVS>

Another method (technique) to identify a location of a node holding data is to obtain the location of the data using a distribution function (for example, a hash function). This type of method is used, for example, in distributed KVS (Key Value Store). Distributed KVS may be regarded as a type of distributed storage system in which a plurality of nodes are configured to implement a storage function of a simple data model, formed of an associative array as in a pair: "Key" and "Value". In the distributed storage system (referred to as a distributed KVS scheme) based on the distributed KVS technique, all clients share a distribution function and a list of nodes participating in the system (node list). Stored data is divided into data fragments (Value) of fixed length or arbitrary length. An identifier by which a data value in question can be uniquely specified is attached to each data fragment, and location of a data fragment is determined using the identifier and the distribution function. For example, since nodes (servers) at storage destinations differ in accordance with key values by a hash function, it is possible to store data in distributed manner in a plurality of nodes. When distribution functions are the same, storage destinations based on the same key are always the same, so that an accessing client can easily comprehend the data access destination. In a concise distributed KVS scheme, a Key is used as an identifier, and by having a Value corresponding to the Key as a unit of stored data, a data access function based on Key and Value is implemented.

In a distributed storage system based on the distributed KVS technique, when accessing data, clients each have a key as an input value of the distribution function, and based on an output value of the distribution function and the node list, arithmetically obtain a location of a node storing the data.

In a distributed storage system based on the distributed KVS technique, among information shared between clients, a distribution function basically do not change with an elapse of time (time invariant). On the other hand, content of a node list changes at any time accompanying a failure or addition of a node. As a result, it is necessary for a client to be able to access these items of information by an arbitrary method.

<Replication>

In a distributed storage system, it is generally performed that a plurality of nodes hold replicas of data and utilize the replicas of data for load balancing, in order to ensure availability (ability of a system to operate continuously).

It is to be noted that Patent Literature 1 discloses technology implementing load balancing using replication of created data. Patent Literature 2 discloses a configuration in which a server comprises an information structure definition unit to define an information structure definition entity, and a registering client builds a database according to the information structure definition entity, generates a database access tool, and uses this tool to register information in the database. Patent Literature 3 discloses a configuration in which a distributed storage system includes storage nodes that store replicated objects capable of being accessed via a locator value specific to each of the respective replicas, and a key map instance that stores each key map entry corresponding to each of respective objects, wherein each key map entry for a prescribed object include a replica of the object, a corresponding key value, and each locator. Patent Literature 4 (whose joint inventors include an inventor of the present application) discloses CDP (Continuous Data Protection) in which each time data is updated, modified content thereof is stored in time series, and data written to storage is tracked and captured. When a data update occurs, by journaling of modified content thereof to a secondary storage (change history database), it is possible to replicate data at any time in the past (Any Point In Time (APIT) Recovery), and it is possible to avoid data loss. Patent Literature 4 discloses a storage system equipped with a data protection function in which, when data is updated, recording change content as a log in time series, data at a point in time in the past is restorable; and as a result of analysis of history information of access to storage, and/or based on information notified from outside, a preset triggeror trigger for data access is extracted, and data corresponding to the preset triggeror trigger extracted is created from log information and data stored and held in the storage, and the created data is stored in the storage as data corresponding to the prescribed timing.

CITATION LIST

Patent Literature

[Patent Literature 1]
Japanese Patent Kokai Publication No. JP-2006-12005A (Patent Publication No. 4528039)
[Patent Literature 2]
Japanese Patent Kokai Publication No. JP-H11-195044A (Patent Publication No. 3911810)
[Patent Literature 3]
Japanese Translation of PCT International Publication, Publication No. JP-2009-522659A
[Patent Literature 4]
Japanese Patent Kokai Publication No. JP-2007-317017A

SUMMARY

The respective disclosures of the respective patent literature described above are incorporated herein by reference. The following describes an analysis of a related technology.

In a distributed storage system of the related technology, in order to maintain availability, replicas of data are held in a plurality of nodes in an identical physical structure. In this way, the distributed storage system implements an access response performance and a guarantee of availability. However, since replicated data is held in an identical physical structure in a plurality of nodes, it is necessary to perform conversion to a different data structure and to prepare a storage that holds the different data structure, for an application using data with a data structure different from the data structure of the replicated data that is held, among applications that read data to analyze the data. Conversion to a different data structure leads to an increase in processing load and in processing delay, and a storage amount for holding a different data structure becomes large.

In this regard, the present inventors finds that an exceptional performance improvement can be anticipated by applying a new scheme with regard to execution of writing (updating) of data, and conversion to a target data structure for the data in question, this scheme is proposed.

It is an object of the present invention to provide a distributed storage system and method that makes it possible to ensure availability with regard to replicated data in a distributed storage, and to improve both write performance and read-side processing performance.

According to the present invention, a configuration as outlined below realizes at least one solution to the above-mentioned problems (however, not limited to the following).

According to the present invention there is provided a distributed storage system comprising:
a plurality of data nodes connected in a network, each data node including a data storage unit, wherein, in response to an update request of data, the data node corresponding to a replication destination of the data, stores data to be updated temporarily in an intermediate structure for holding write data, and the data node performs conversion of the data to be updated in the intermediate structure to an associated target data structure asynchronously with respect to the update request received, to store the resulting data structure in the data storage unit thereof;
an access history recording unit to store history of frequency of access to the data node; and
a unit configured to change trigger information that is a trigger for conversion to the target data structure performed asynchronously by the data node, based on access history information recorded in the access history recording unit.

According to the present invention there is provided a data replication method for distributed storage including a plurality of data nodes connected in a network, each data node including a data storage unit, the method comprising:
in replication of data corresponding to an update request of the data,
the data node corresponding to a replication destination storing data to be updated temporarily in an intermediate structure for holding write data, and performing conversion of the data to be updated in the intermediate structure to an associated target data structure asynchronously with respect to the update request received, to store the resulting data structure in the data storage unit thereof,
changing trigger information that is a trigger for conversion to the target data structure performed asynchronously by the data node, based on access history information of access to the data node.

According to the present invention, availability of replicated data in distributed storage is ensured, and improvement in both write performance and read-side processing performance is enabled.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIGS. 3A and 3B are diagrams schematically illustrating data structure management information 921 in the exemplary embodiment of the invention.

FIGS. 4A, 4B, 4C and 4D are diagrams schematically illustrating an example of a data holding structure of a table in an exemplary embodiment of the invention.

FIG. 5 is a diagram illustrating an example of data arrangement specifying information 922 in an exemplary embodiment of the invention.

PREFERRED MODES

Figure 1:
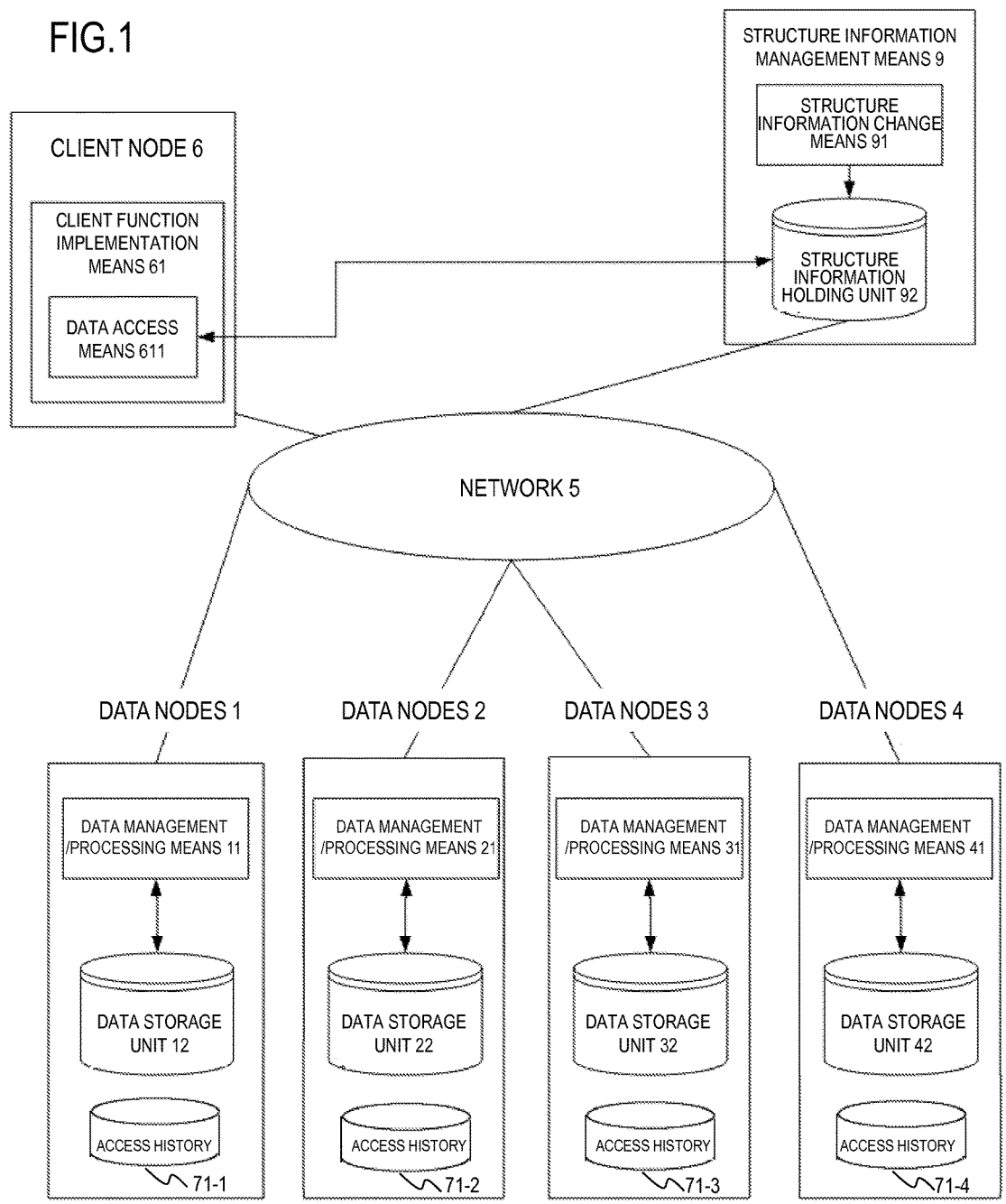
FIG. 1 is a diagram illustrating a system configuration in an exemplary embodiment of the present invention.

The following describes several preferred modes for carrying out the invention. In one aspect of preferred modes, there are provided a plurality of data nodes connected in a network, each data node including a data storage unit. In replication of data when data is updated, for example, one or more data nodes each corresponding to replication destination, store the data to be updated temporarily in an intermediate data structure thereof used for holding write data (Queue, FIFO (First In and First Out), Log, or the like) and perform conversion of the data to be updated in the intermediate data structure respectively to associated target data structures, asynchronously with respect to an update request, to store the data converted to the respective target data structures in the data storage units (12). In addition, there is provided an access history recording unit (71) that stores history of frequency of access to the data node. The access history recording unit (71) may be implemented in the data node or implemented as a node that is connected in the network and other than the data node. Trigger information concerning a trigger to conversion to the target data structure that is performed asynchronously by the data node, may be variably set based on access history information (access frequency) stored in the access history recording unit (71). A unit that changes the trigger information based on the access history information may be provided in the data node or provided in a node that is connected in the network and other than the data node.

In one aspect of the preferred modes, the data node of the replication destination may be arranged to hold the data in the intermediate structure, and to return a response. The data node of the replication destination, in response to an elapse of a time, prescribed by the trigger information, as from reception of the data to be updated, performs conversion of the data structure held in the intermediate structure asynchronously to the target data structure to store the converted data in a data storage unit.

In one aspect of the preferred modes, on a per predetermined table basis, a data node of data arrangement destination, and a target data structure in the data node of data arrangement destination may be controlled.

In one aspect of the preferred modes there are provided a structure information management apparatus (9), a client function implementation unit (61) and a plurality of the data nodes (1 to 4). The structure information management apparatus (9) includes a structure information holding unit (92) that performs storage management of data structure management information (921 in FIG. 2: FIGS. 3A and 3B) and data arrangement specifying information (922 in FIG. 2: FIG. 5).

Figure 2:
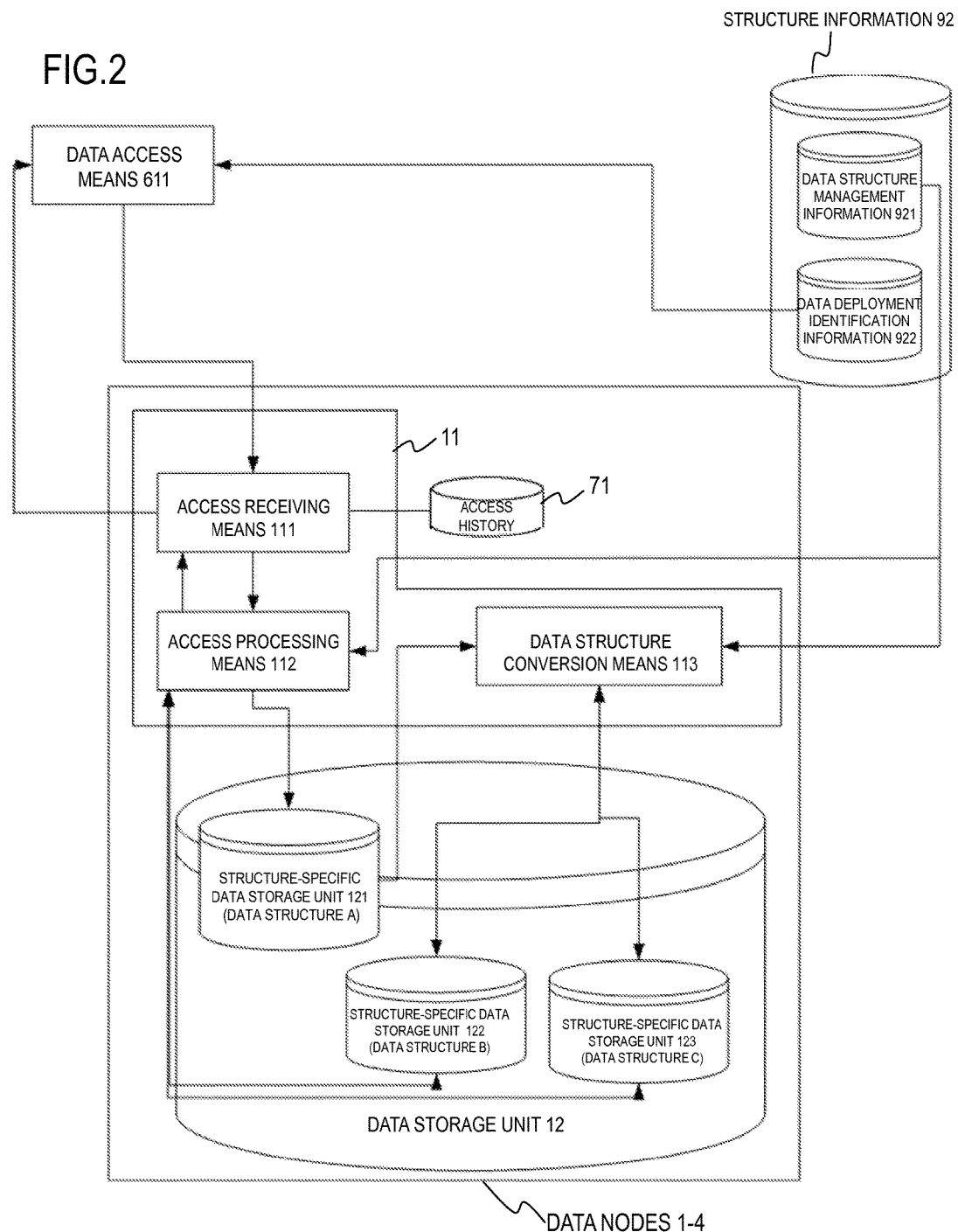
FIG. 2 is a diagram illustrating a configuration example of a data node in an exemplary embodiment of the invention.

The data structure management information (921 in FIG. 2: FIGS. 3A and 3B) includes, in correspondence with a table identifier to identify data to be stored, a replica identifier to identify a replica;

data structure information to identify a type of data structure corresponding to the replica identifier; and trigger information that is timer information of a time until the data being converted to a specified data structure and stored, the number of information entries each including the table identifier, the replica identifier, the data structure information, and the trigger information corresponding to the number of types of the data structure.

The data arrangement specifying information (922 in FIG. 2: FIG. 5) includes a replica identifier in correspondence with a table identifier, and data node information of one or more data arrangement destinations corresponding to the replica identifier.

The client function implementation unit (61) includes a data access unit that identifies an access destination of update processing and read processing, by referring to the data structure management information and the data arrangement specifying information.

The data nodes (1 to 4) each include a data storage unit (12) and are connected to the structure information management apparatus (9) and the client function implementation unit (61).

The data node may be configured to include a data management and processing unit (11) that includes an access receiving and processing unit (111, 112) that temporarily holds data in an intermediate structure and returns a response to the client function implementation unit (61), when performing update processing, based on an access request from the client function implementation unit (61), and a data structure conversion unit (113) that performs processing of converting data held in the intermediate structure to a data structure specified by the data structure management information, by referring to the data structure management information and responding to a specified update trigger.

In one aspect of the preferred modes, there is provided a change determination unit (72) that determines whether or not to change update trigger information of the data structure management information (921) of the structure information holding unit by using access information recorded in the access history recording unit (71) or other access information obtained by processing the access information, and in the case where the update trigger information of the data structure management information (921) is changed, gives notification to the structure information management apparatus; and the structure information management apparatus (9) includes a structure information change unit (91) that receives a notification of change of the update trigger information from the change determination unit (72), and changes the update trigger information of the data structure management information. In the preferred modes, access frequency may be recorded as access information in the access history recording unit (71).

In one aspect of the preferred modes, the access information recorded in the access history recording unit (71) may include frequency information of access to read from the data storage unit and access to write data to the intermediate structure (or, it is possible to have information indicating access occurrence patterns, tendencies of access occurrences and so forth).

In one aspect of the preferred modes, the data node includes an access receiving unit (111), an access processing unit (112), and a data structure conversion unit (113). The data storage unit (12) of the data nodes includes: structure-specific data storage units (121 to 123). The access receiving unit (111) receives an update request from the client function implementation unit, forwards the update request to a specified data node corresponding to a replica identifier in the data arrangement specifying information, and in addition logs an access request in the access history recording unit. The access processing unit (112) of the data nodes performs processing of the update request received, and refers to information of the data structure management information to execute update processing. In this regard, when the update trigger information for the data node from the information of the data structure management information is zero, the update data may be converted to a data structure specified in the data structure management information to be stored in the structure-specific data storage unit. When the update trigger is not zero, the update data may be written to the intermediate structure, and a response of processing-complete may be made. The access receiving unit (111), on reception of:

a completion notification from the access processing unit (FIG. 14), or a completion notification from the access processing unit and a completion notification from each data node of a replica destination (FIG. 13), may respond to the client function implementation unit (9). The data structure conversion unit (113) may convert the data held in the intermediate structure to a data structure specified in the data structure management information, to be stored in the structure-specific storage units (121 to 123) of a conversion destination.

The following describes several exemplary embodiments.
<System Configuration>

FIG. 1 is a diagram illustrating an example of a system configuration of an exemplary embodiment of the present invention. There are provided the data nodes 1 to 4, a network 5, a client node 6, and a structure information management means (structure information management apparatus) 9.

The data nodes 1 to 4 are data storage nodes that form distributed storage. The number of the data nodes may be one or an arbitrary number. The network 5 implements communication among network nodes including the data nodes 1 to 4. The client node 6 is a computer node that accesses the distributed storage. The client node 6 is not necessarily an independent entity. It is to be noted that an example where the data nodes 1 to 4 each serving as a client computer is described later, with reference to FIG. 2. The data nodes 1 to 4 respectively include data management and processing means (data management and processing units) 11, 21, 31 and 41, data storage units 12, 22, 32 and 42, and access history recording units 71-1 to 71-4.

The data management and processing means X1 (X=1, 2, 3, 4) receives an access request for distributed storage, and executes processing. The data storage unit X2 (X=1, 2, 3, 4) performs holding and recording of data that the data nodes handle.

The client node 6 includes a client function implementation means (client function implementation unit) 61. The client function implementation means 61 accesses distributed storage configured by the data nodes 1 to 4. The client function implementation means 61 includes a data access means (data access unit) 611.

The data access means (data access unit) 611 acquires structure information (data structure management information and data arrangement specifying information) from the structure information management means 9, and uses the structure information acquired to identify a data node of an access destination.

It is to be noted that with regard to an arbitrary apparatus (switch, intermediate node) provided in the respective data nodes 1 to 4 or the network 5, a part or all of structure information stored in the structure information holding unit 92 of the structure information management means 9 may also be held in a cache (not shown in the drawings) in the apparatus itself or in another apparatus.

An access to structure information stored in the structure information holding unit 92, may be an access to a cache (not shown in the drawings) arranged in the apparatus itself or in a predetermined prescribed location. With regard to synchronization of structure information stored in a cache (not shown in the drawings), since well-known distributed system technology can be applied, details thereof are omitted here. As is well known, storage performance can be speeded up by utilization of cache.

The structure information management means (structure information management apparatus) 9 includes a structure information change means 91 that changes structure information, and a structure information holding unit 92 that holds structure information. The structure information holding unit 92 includes data structure management information 921 (refer to FIG. 2) and data arrangement specifying information 922 (refer to FIGS. 4A to 4D). The data structure management information 921, which is described later with reference to FIGS. 3A and 3B, includes, with respect to a table identifier, entries, the number of which corresponds to the number of replicas of data, and each of which includes a replica identifier to identify a replica, data structure information to identify a type of data structure corresponding to the replica identifier, and an update trigger that is time information up to being stored as a specified data structure. The data arrangement specifying information 922, which is described later with reference to FIG. 5, includes, with respect to the table identifier, a replica identifier and data node information of one or a plurality of data arrangement destinations corresponding to the replica identifier.

The access history recording units 71-1 to 4 record log information of Read access and Write access with regard to the data nodes 1 to 4. As access log information, frequency information corresponding to the number of times access is made within a prescribed period may be stored.

It is to be noted that in FIG. 1, the client node 6 is provided independently (separately) from the data nodes 1 to 4, but it is not necessarily required that the client node 6 be provided independently (separated) from the data nodes 1 to 4. That is, as described in the variation examples below, the configuration may be such that the client function implementation means 61 is provided in any one or more of the nodes.

<Configuration Example of Data Node>

FIG. 2 is a diagram illustrating details of a configuration example of FIG. 1. FIG. 2 shows a configuration focused on the data nodes 1 to 4 of FIG. 1. Since the data nodes 1 to 4 of FIG. 1 basically have the same configuration, FIG. 2 illustrates a data management and processing means 11, a data storage unit 12, and an access history recording unit 71 (corresponding to 71-1 in FIG. 1) of the data node 1. It is to be noted that in drawings such as FIG. 2 and the like, for simplicity, structure information stored in the structure information holding unit 92 may be referred to by reference number 92.

The data management and processing means 11 of data node 1 includes an access receiving means (access receiving unit) 111, an access processing means (access processing unit) 112, and a data structure conversion means (data structure conversion unit) 113. The data management and processing means 21, 31 and 41 of the other data nodes 2 to 4 have the similar configuration.

The access receiving means 111 receives an access request from the data access means 611, and after completing processing, returns a response to the data access means 611.

The access processing means 112 uses the structure information of the structure information holding unit 92 (or cache information held at an arbitrary location thereof) to perform access processing with respect to the data storage unit 12X (X=1, 2, 3) in question.

The access receiving means 111 records information of the access request (access command) together with reception time information for example, in the access history recording unit 71.

The data structure conversion means 113 uses data of the structure-specific data storage unit 121, on each constant trigger, to perform conversion to the structure-specific data storage unit 12X (X=1, 2, 3).

The data storage unit 12 includes plural types of structure-specific storage units. While not limited thereto, in FIG. 2, there are provided a structure-specific data storage unit 121 (data structure A), a structure-specific data storage unit 122 (data structure B), and a structure-specific data storage unit 123 (data structure C). Data structure is arbitrarily selected on a per structure-specific data storage unit 12X (X=1, 2, 3) basis.

The structure-specific data storage unit 121 (for example, data structure A) has a structure specialized for response performance with regard to processing (adding or updating of data) associated d with data writing. Specifically, software that holds contents of change of data in high speed memory (dual port RAM (Random Access Memory) or the like), as a queue (FIFO (First In First Out), for example), software that adds access request processing content as a log to an arbitrary storage medium, and the like are installed. Data structure B and data structure C are data structures that differ from data structure A, and have mutually different data access characteristics. It is to be noted that the data storage unit 12 need not necessarily be a single storage medium. A scheme may be adopted where the data storage unit 12 of FIGS. 4A to 4D is implemented as a distributed storage system formed of a plurality of data arrangement nodes, and the respective structure-specific data storage units 12X are stored in a distributed manner.

The data arrangement specifying information 922 is data stored in distributed storage or information for identifying a storage destination of a data fragment (and means for storing and acquiring information). As a data distribution arrangement method, a meta server scheme or a distributed KVS scheme is used for example, as described above.

In the case of the meta server scheme, information to manage data position information (for example, block address and a corresponding data node address thereof) is the data arrangement specifying information 922. With regard to the meta server, it is possible to comprehend the arrangement destination of necessary data by referring to this information (meta data).

In the case of the abovementioned distributed KVS scheme, a list of nodes referred to by the system relates to this data arrangement specifying information. By using an identifier for storing data and the node list information, it is possible to determine a data node of a data storage destination.

The data access means 611 uses the data arrangement specifying information 922 in the structure information management means 9, or cache information of the data arrangement specifying information 922 stored in a predetermined prescribed location, to identify a data node 1 to 4 to be accessed, and issues an access request to the access receiving means 111 of the data node.

<Data Structure Management Information>

The data structure management information 921 of FIG. 2 is parameter information for identifying a data storage scheme for each data set. FIGS. 3A and 3B are diagrams showing an example of the data structure management information 921 of FIG. 2. While there is no limitation in particular, in the example illustrated in FIGS. 3A and 3B, data storage scheme is controlled on per a table basis. In each table (each table identifier), respective information of a replica identifier, a type of data structure and an update trigger, is prepared for the number of replicas of the data replication.

In FIG. 3A, each table holds 3 replicas in order to ensure (retain) availability (note that the number of replicas is not limited to 3). The replica identifier is information to specify each replica. In FIG. 3A, numbers 0, 1, and 2 are assigned as the replica identifiers. The data structure is information indicating a data storage scheme. In FIG. 3A, the three types of data structure (A, B, and C) designate different schemes, for each replica identifier.

FIG. 3B indicates an example of a data storage scheme for data structures A, B and C (though not limited thereto). In the example of FIG. 3B, as types of data storage scheme, A: Queue, B Row Store, and C: Column Store.

are specified. In the example of FIG. 3B, a replica identifier 0 of a table identifier "Stocks" is stored as the data structure B (row store). j The data structure is a scheme for storing respective data.

A: Queue is a Linked List.

B: Row Store stores table records in a row order.

C: Column Store stores in a column order.

<Table Configuration Example>

FIGS. 4A to 4D are diagrams schematically illustrating an example of a data holding structure in a table. The table of FIG. 4A includes a Key column and three Value columns, and each row is formed of a set of a Key and three Values.

A column store and row store respectively have forms which have row based and column based storing order in a storage medium. As a storage scheme of the table (refer to FIG. 4A), data of replica identifiers 0 and 1 is held in data structure B (row store) (refer to FIGS. 4B and 4C), and data of replica identifier 2 is held in data structure C (column store) (refer to FIG. 4D).

<Update Trigger Information>

Referring again to FIG. 3A, an update trigger in the data structure management information 921 (refer to FIG. 2) is a timing trigger up to data being stored as a specified data structure. In an example of a replica identifier 0 for Stocks, 30 seconds is specified. Therefore, in a data node storing a data structure B (row store) of the replica identifier 0 for Stocks, it is indicated that a data update is reflected at timing of 30 seconds, with respect to the structure-specific data storage unit 122 of the row store scheme. Data is held in an intermediate structure such as a queue, until the data update is reflected. The data node, responsive to a request from a client, after storing data in the intermediate structure, sends a response to the client. In the present exemplary embodiment, conversion to a specified data structure is performed asynchronously, with respect to an update request.

The following describes an example in which forwarding of the data to be updated between data nodes is performed synchronously, and conversion to a data target structure is performed asynchronously. An example is described in which a timer is used as update trigger information where a data structure is converted asynchronously (Note that the present invention is no limited to the following implementations).

<Data Arrangement Identification Information>

FIG. 5 is a diagram illustrating an example of the data arrangement specifying information 922 of FIG. 2. An arrangement node (data node of data storage destination) is specified for each of the replica identifiers 0, 1 and 2 (refer to FIGS. 3A and 3B) of each table identifier. This corresponds to the abovementioned meta server scheme. In the case of the distributed KVS scheme, the data arrangement specifying information 922 corresponds to node list information (not shown in the drawings) participating in distributed storage. By sharing this node list information among data nodes, with "table identifier"+"replica identifier" as key information, for example, it is possible to identify an arrangement node by a consistent hashing scheme. As an arrangement destination of a replica, storage is possible in an adjacent node in the consistent hashing scheme.

<Write Intermediate Structure: Comparative Example>

Figure 6:
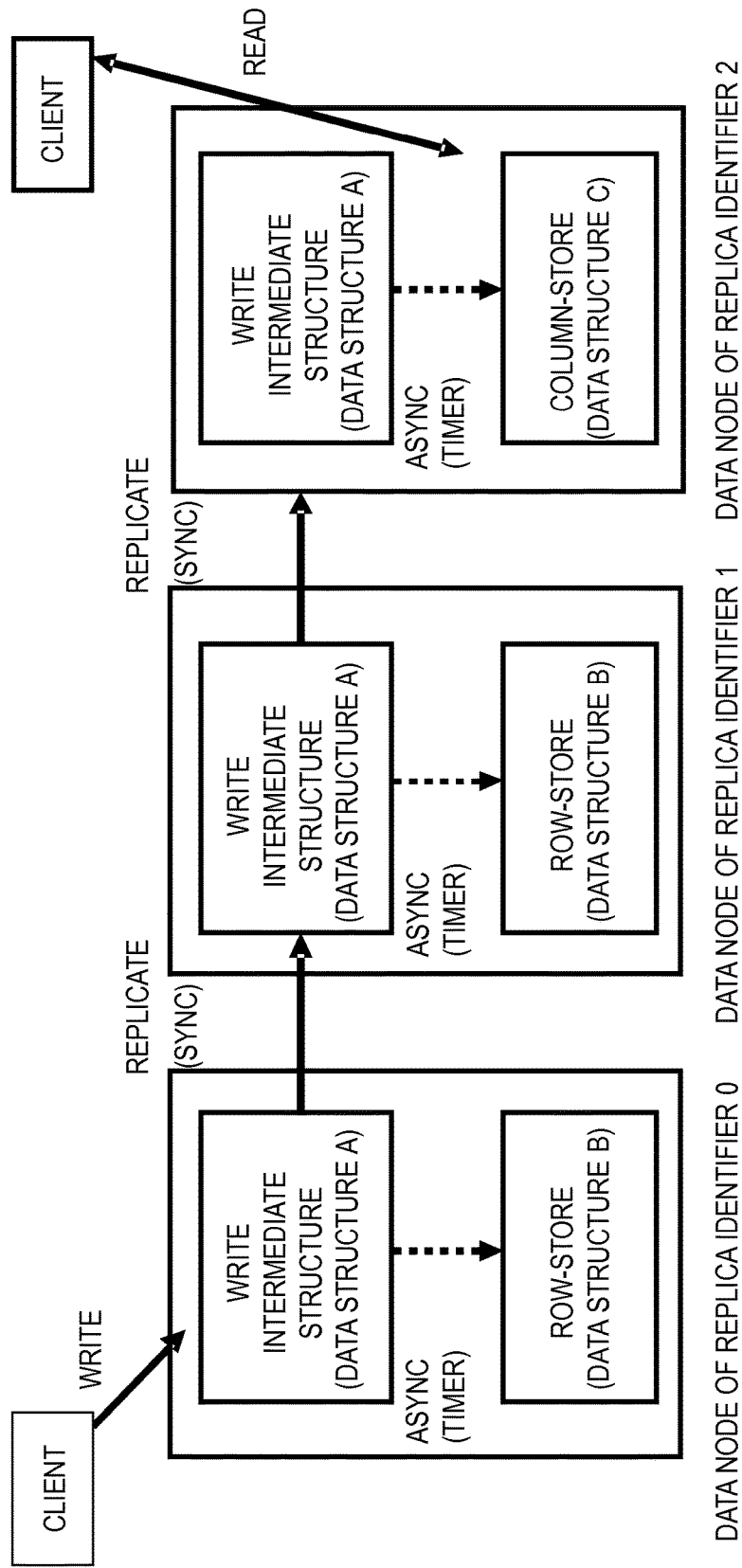
FIG. 6 is a diagram schematically explaining data holding and asynchronous updating.

FIG. 6 is a diagram schematically explaining a basic form of data holding and asynchronous updating in a table. FIG. 6 is a diagram for explaining problems solved by the present invention, and therefore serves also as a diagram explaining a comparative example with respect to the present invention.

When the update trigger information value is greater than 0, each data node has a structure with an excellent response speed for Write (update request) as an intermediate structure (referred to as "Write primary structure", or "Write intermediate structure"), and update content is accepted. At a point in time when writing to the Write intermediate structure is done, a response of processing-completion is returned to a client that is the source of the update request.

The update data written into the Write intermediate structure of respective data nodes are each updated asynchronously to a conversion target data structure in respective data nodes. In the example shown in FIG. 6, by a Write operation, for a data node having a replica identifier of 0, data structure A is stored and held in the Write intermediate structure, and the data of data structure A held in the Write intermediate structure is replicated synchronously with respect to data nodes with replica identifiers 1 and 2. In each of the data nodes with replica identifiers 1 and 2, data of data structure A forwarded from data nodes with replica identifiers 0 and 1 is temporarily stored and held in the Write intermediate structure. In the data nodes corresponding to each of the data structures corresponding to replica identifiers 0, 1 and 2, conversion to target data structures B and C is specified by update trigger information of the data structure management information 921 as shown in FIG. 3A. In the data node with replica identifier 0, for example, a timer is started from a Write operation with regard to data structure A, and when 30 seconds has elapsed (timeout: update trigger occurrence), conversion is performed to data structure B (Row-Store). In the data node with replica identifier 1, a timer is started on receiving the data structure A forwarded synchronously (Sync) from the data node with replica identifier 0, and when 60 seconds has elapsed (timeout: update trigger occurrence), conversion is performed to data structure B (Row-Store). In the data node with replica identifier 2, a timer is started on reception of the data structure A forwarded synchronously (Sync) from a data node with replica identifier 1, and when 60 seconds has elapsed (timeout: update trigger occurrence), conversion is performed to data structure C (Column-Store).

As shown in FIG. 6, replication among data nodes of update data (data structure A) written to a Write intermediate structure of one data node is performed synchronously (Sync) with writing (updating). With this type of configuration, it is possible to improve Write response speed for Write data to which an immediate access of a Read system is present.

When an access of a Read system is performed, since conversion is already performed to a data structure necessary for the Read access, by using the converted data structure to process the Read system access, it is possible to realize high speed processing. In addition, it is possible to use properly an access destination node by selecting a suitable data structure, in accordance with type of Read system access.

It is to be noted that in FIG. 6 and the like, in order to simplify the description, three types of data structure, A, B and C are used, but clearly the number of types of data structure is not limited to three, and an arbitrary number of types of different characteristics is possible. As data structure examples, three types: queue, column store and row store have been exemplified, but it is as a matter of course intended to be limited to these examples. For example, the following are also possible:

presence/absence of an index in a row store structure,
difference in type of column where an index is created,
row store scheme that stores an update in an adding type structure.

In this way, with a Write primary intermediate structure and an asynchronous structure conversion, it is possible to avoid a structure conversion bottleneck and maintain availability. By enabling control of data arrangement node, data structure, and timing (timeout period with regard to a timer) applied to asynchronous conversion, margins for various types of applications and for load variation can be expanded.

The reason why replication of a different data structure synchronously (Sync) is adopted is that using a data structure such as a queue/log of a First-In and First-Out (FIFO) scheme as a Write intermediate structure having a large overhead, storing once data in the intermediate structure, and then reflecting a change, has good conversion processing efficiency, and the effect on system access performance is small.

However, in the configuration shown in FIG. 6, a trigger for performing data conversion asynchronously, in response to data utilization state (setting value of an asynchronous timer (Async (timer)) in FIG. 6) is not necessarily always optimal.

With a value set for the asynchronous timer of FIG. 6 being short, and high frequency of the data structure conversion, there may be some possibility that the Write performance of the system may suffers from a negative impact. Conversely, with a value set (timeout period: update trigger information) for the asynchronous timer of FIG. 6 being long, and low frequency of the data structure conversion, in a system (analysis system) using the converted data structure in question, analysis of the latest data is not guaranteed, and a problem may occur with regard to reliability of analysis results.

Figure 7:
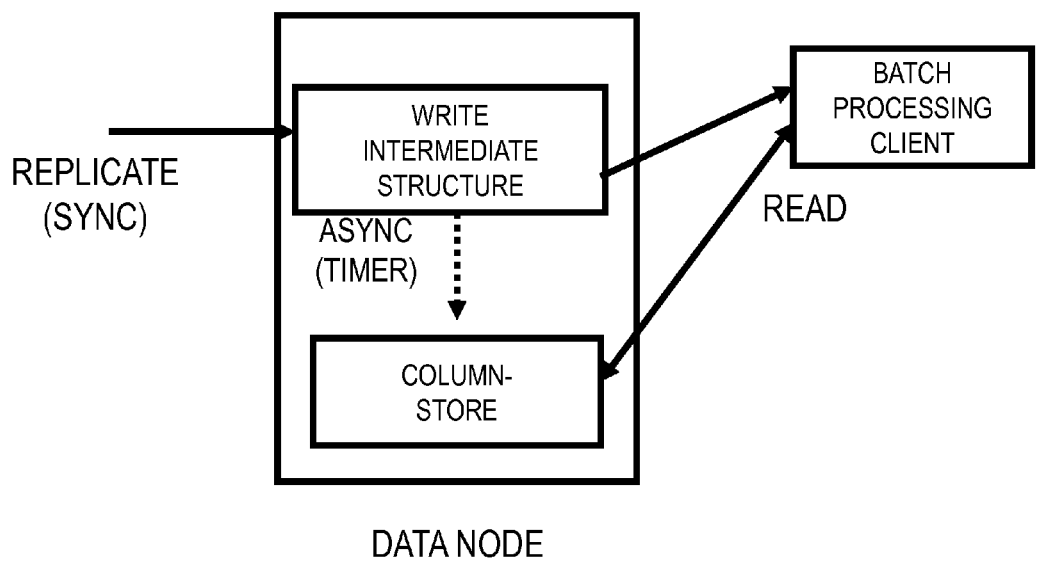
FIG. 7 is a diagram schematically explaining Write processing and processing of an analysis system in FIG. 6.

That is, in the data node of FIG. 7, when the setting value (timeout period) of the timer (Async (timer)) prescribing timing for data structure conversion is relatively large, in the data node in question, after accumulating data in the Write intermediate structure, the time until conversion to a target data structure (column store format in FIG. 7) becomes long. That is, in the data node, conversion to the target data structure and storage to the data storage unit are hardly performed, and only accumulation of data into the Write intermediate structure is performed. In this case, the performance of a Write system is good. Furthermore, since conversion of the data structure of the data accumulated in the Write intermediate structure may be done all at once (for example, the column format), conversion processing by a data structure conversion means (113 in FIG. 2) is efficient.

However, with regard to a batch processing client for which, in the data node, time from receiving data until conversion of the data to a target data structure is long, and batch processing or the like is performed at a predetermined time or in a time period (analysis of data converted to the target structure is performed in batch processing), analysis of old data having a data structure thereof converted (old data) is performed. When the latest or new data is necessary, data accumulated in the Write intermediate structure of the data node (waiting for conversion of data structure) is read, the data structure thereof is converted to a column store format that is a target data structure (new data), and the difference between new and old data in these column store formats is reflected, to perform analysis. In this case, load on a client side increases.

On the other hand, in the data node, if the setting value (timeout period: update trigger information) of the asynchronous timer (Async (timer)) prescribing timing for data structure conversion is relatively small, in the data node in question the received data must be converted to the target data structure little by little at short time intervals. As a result, in the case where the setting value of the asynchronous timer (Async (timer)) is small, the Write performance of the data node in question becomes unfavorable in comparison with the case where the setting value of the asynchronous timer (Async (timer)) is large. On the other hand, in the case where the setting value of the asynchronous timer (Async (timer)) is small, a client (batch processing client) performing analysis of data in batch processing, for example, can always refer to new data. Since data having data structure thereof converted asynchronously is relatively recent data, when the client refers to newer data, the data amount read from the Write intermediate structure is small, and the load on the client side is small.

In the configuration of FIG. 6, a trigger for conversion of a data structure by an asynchronous scheme in each data node depends, for example, on the way of referring (Read access) to data from the client side.

<Write Intermediate Structure: Exemplary Embodiment>

Figure 8:
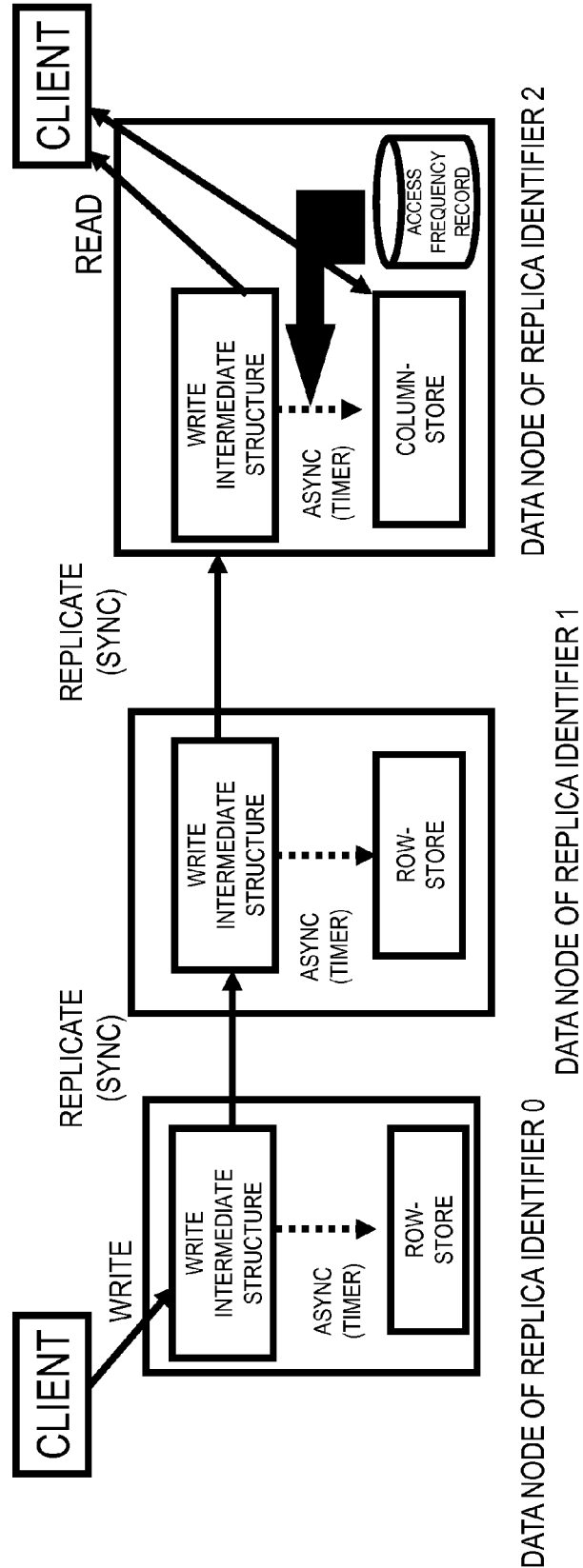
FIG. 8 is a diagram schematically explaining data holding and asynchronous updating in an exemplary embodiment of the invention.

Accordingly, the present exemplary embodiment, as shown in FIG. 8, is arranged to adjust a trigger (update trigger information in FIG. 3A) for conversion of a data structure in association with an access frequency, for example. When the access frequency (Read access frequency) is less than or equal to, or greater than or equal to, a predetermined threshold, a setting valve (timeout period) of an asynchronous timer (Async (timer)) is made large or small. That is, the value of the update trigger information (asynchronous timer: update trigger information in FIG. 3A) of the data structure management information 921 (FIG. 2) is adjusted to match the access frequency.

In the case where a load of a Write system is large/small in comparison to a load of a Read system (analysis system), the setting value (timeout period) of the asynchronous timer (Async (timer)) is increased/decreased. That is, in the case where the frequency of Write access is large in comparison to the frequency of Read access, the setting value (timeout period) of the asynchronous timer is increased.

Or, based on access history information, if a pattern of Read access is periodic (for example, a case where Read access is performed periodically), the data accumulated in the Write intermediate structure may be converted to a target data structure, to match Read timing (date/time, time period etc. of Read access), and stored, and after the conversion, the setting value (timeout period) of the asynchronous timer (Async (timer)) may be increased. Or, since it is sufficient to be in time for a next one of Read accesses that are periodically performed, by increasing the setting value (timeout period) of the asynchronous timer (Async (timer)), the number of conversions of data structure is decreased. Though not limited thereto, a configuration may be set such that the data structure of the newest data possible is converted before (immediately before) the next Read access is performed.

When access history information is changed, by synchronizing (linking) with this change, for example, the value (timeout period of asynchronous timer) of the update trigger information of the data structure management information 921 (FIG. 2) may be adjusted.

According to the present exemplary embodiment, by only performing adjustment of the value of the update trigger information (asynchronous timer), it is possible, for example, to optimize balance between performance of a Write system for online processing and performance of an analysis system (Read system) in batch processing.

It is to be noted that in FIG. 8, access frequency is illustrated in order to clarify a relationship with change of setting value of the asynchronous (Async) timer, and a configuration is shown in which the access frequency information is stored and held inside a data node, but the access frequency information of a data node may be provided in a data node external unit. Or, with regard to a plurality of data nodes, the access frequency information for the data nodes may be stored and managed by a shared storage. Furthermore, in the data nodes, an access history (log) may be used, access frequency may be calculated based on the access history information, and based on the access frequency, the setting value (update trigger information) of the asynchronous (Async) timer may be changed. Or, instead of access frequency (number of times of applying for access in a unit period), an access pattern or the like indicating an access tendency and a characteristic may be used to change the setting value (update trigger information) of the asynchronous (Async) timer.

<Change Determination Means>

Figure 9:
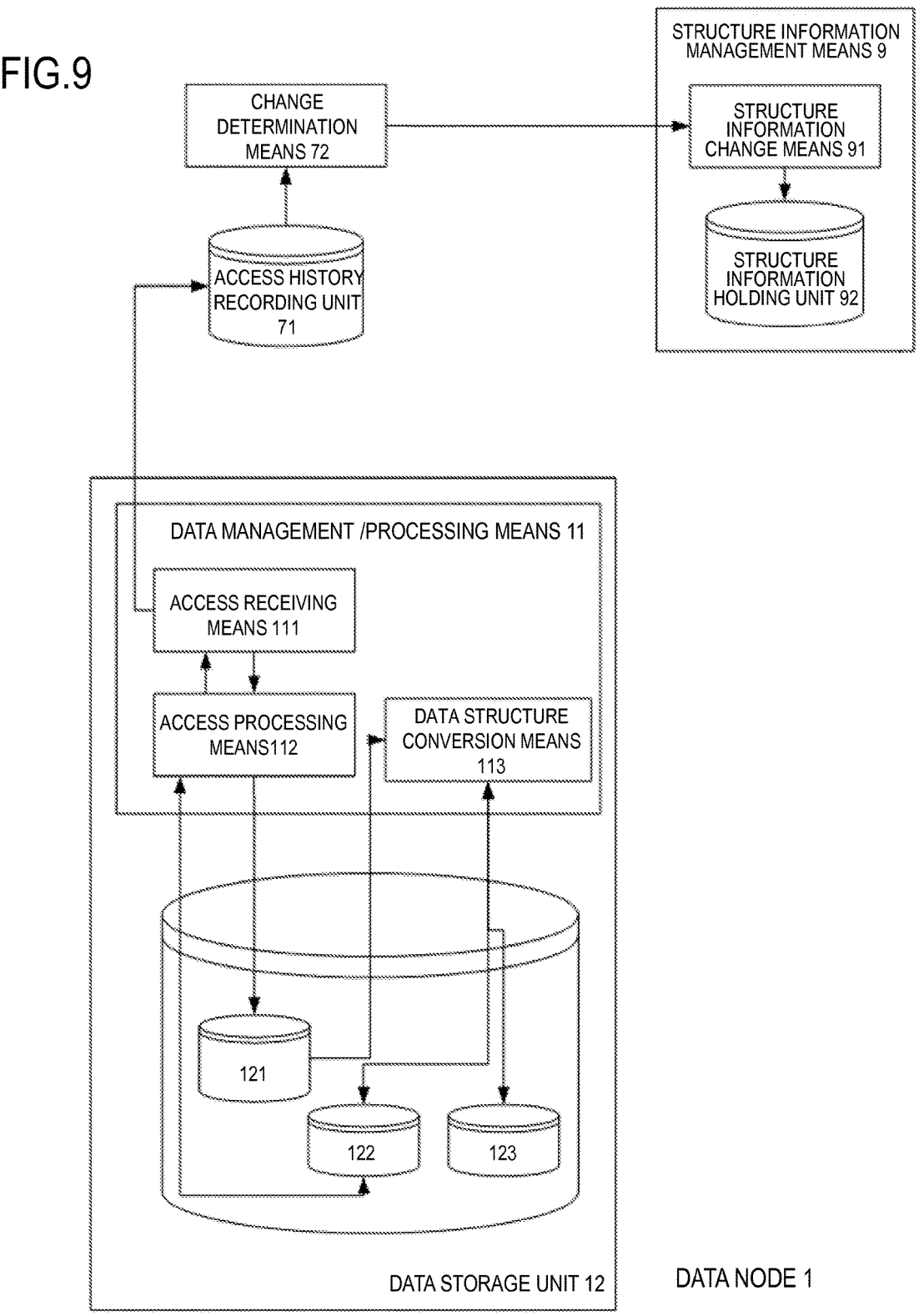
FIG. 9 is a diagram illustrating a configuration example of an access history recording unit and a structure information management means in an exemplary embodiment of the invention.

FIG. 9 is a diagram illustrating an example of a configuration performing adjustment of the update trigger information of the data structure management information 921. As shown in FIG. 9, there is provided a change determination means (change determination unit) 72, which determines whether or not to perform a change of the update trigger information of the data structure management information 921, based on access information of the access history recording unit 71.

As described with reference to FIG. 2, an access receiving means 111 of each data node records an access request received in the access history recording unit 71. The access history recording unit 71 associates an access request (including a table identifier of FIG. 3A, and a replica identification value or the like of the data node in question) with time information (data/time information) at which the access request was received, and performs recording.

It is to be noted that the access history recording unit 71 is provided for each data node, but it is possible to have a configuration provided with one thereof for a data node group formed of a plurality of data nodes, or to provide one for an entire system. Or, it is possible to provide the access history recording unit 71 for each data node, and to provide a mechanism to aggregate access frequency information collected individually by each data node, by an arbitrary method.

The change determination means (change determination unit) 72 may use the access history information stored in the access history recording unit 71 to determine whether or not to change the update trigger information related to a corresponding data node, according to large or small (result of comparison with a threshold) of access frequency within, for example, the most recent of past periods of a prescribed length. Or, the access frequency within the most recent of past periods of a prescribed length may be calculated, and a determination is made as to whether or not to change the update trigger information related to a corresponding data node, according to large or small (result of comparison with threshold) of variation from a value of access frequency information in an immediately previous period of a prescribed length.

In the case where it is necessary to change the update trigger information (setting value of timeout period of asynchronous timer) in order to perform conversion asynchronously in a related data node, the change determination means 72 issues a request to change the setting value of the asynchronous timer, to the structure information change means 91. The change request from the change determination means 72 includes a replica identifier corresponding to a data node, table identifier information, and node information of the data node. In addition, the change request from the change determination means 72 may include an instruction to not perform a change (change value=0), to increment or decrement by a preset unit, or to increase or decrease by a multiple of a preset unit, with respect to the present asynchronous timer setting value. Or, such a configuration is possible in which a change value of the asynchronous timer setting value is derived by the change determination means 72, and the change value is set in the change request; and the setting value of the present asynchronous timer is replaced by the change value, by the structure information change means 91. It is to be noted that relationships between the table identifier information, the replica identifier, and the data node information (arrangement node number) are prescribed in the data arrangement specifying information 922, and in the structure information change means 91, the update trigger information of the table identifier information and the replica identifier are modified in the data structure management information 921, from the data node information (ID), the replica identifier, and the table identifier information, in response to a change request from the change determination means 72.

It is to be noted that in FIG. 9, the change determination means 72 is configured to be arranged separately from the data management and processing means 11 of the data node 1, but the change determination means 72 may be installed within the data management and processing means of each data node, and the access frequency information calculated by the change determination means 72 may be held in the access history recording unit 71.

It is to be noted that, as access frequency information, there is no limitation to the number of times a Read access request is generated or a Write access request is generated for each unit period, and for example, it is also possible to have information of the generation pattern of the Read and Write access requests (a time table thereof, in the case where the Read, Write access occurs at a fixed point in time).

<Access Flow of Client>

Figure 10:
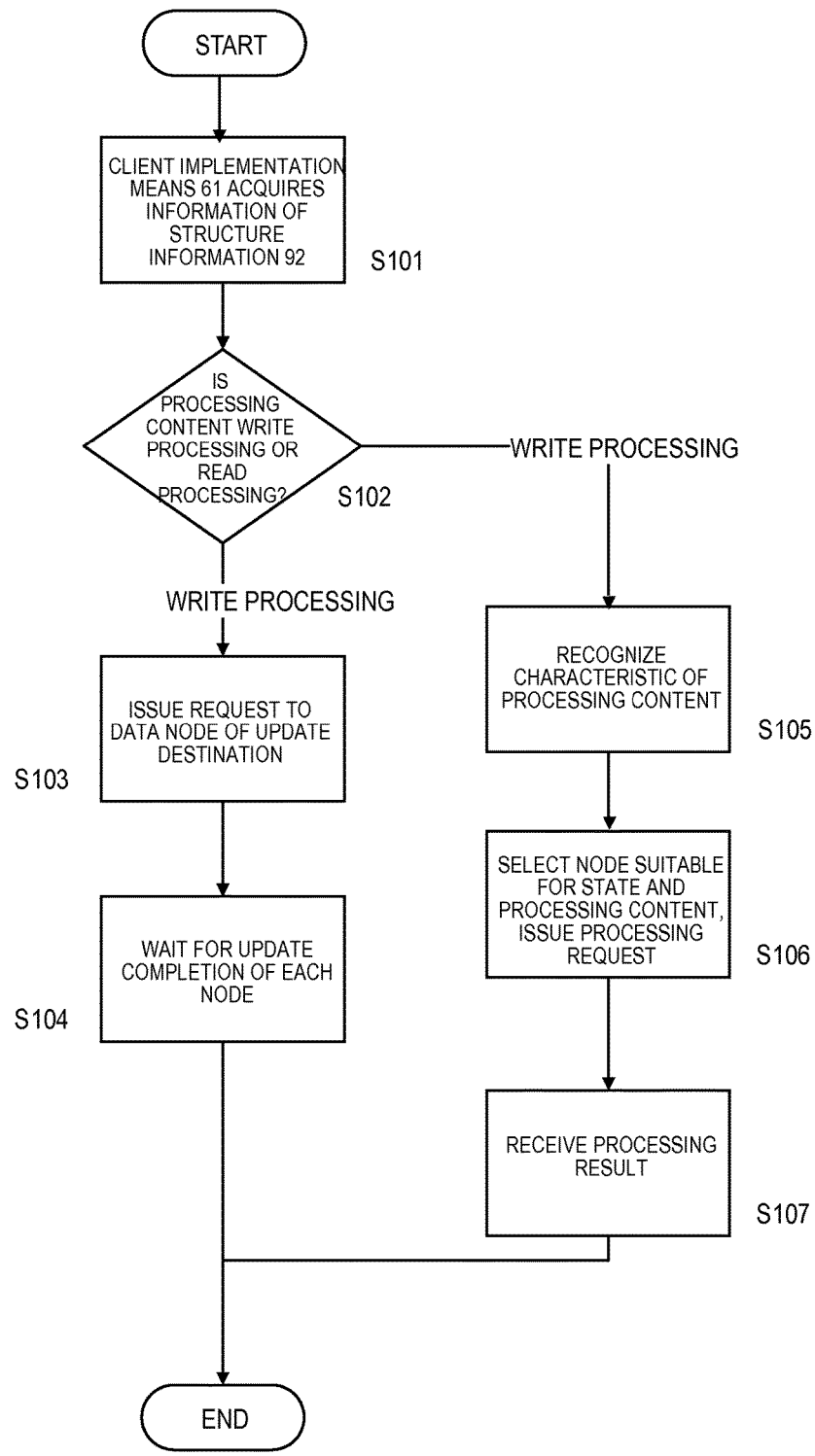
FIG. 10 is a flowchart illustrating an access processing operation in a client function implementing means 61 in an exemplary embodiment of the invention.

FIG. 10 is a flowchart for describing operations of the client function implementation means 61, in which the client function implementation means 61 of FIG. 1 issues a command to the data node at an update destination and waits. The following describes an access flow for the client with reference to FIG. 10.

The client function implementation means 61 obtains information of the structure information holding unit 92 by accessing master data (master file), or a cache at an arbitrary location (cache memory that stores a replication of part of the master data) (Step S101 in FIG. 10).

Next, the client function implementation means 61 distinguishes whether the content of the command issued by the client is Write processing or is Read processing (Step S102).

This can be done by designation by an issued command or by analyzing execution codes of the command. For example, regarding a storage system processing SQL, in the case of an INSERT command (an SQL command adding a record to a table), the processing is Write processing, in the case of a SELECT command (an SQL command that refers to and searches a record of from the table), the processing is Read processing.

Or, when the client function implementation means 61 is used to call a command, it is possible to make a designation explicitly (this type of API (Application Program Interface) is prepared).

As a result of Step S102, in the case of Write processing, the flow proceeds to Step S103 and following steps.

In the case of Write processing, the client function implementation means 61 identifies a node requiring updating by using information of the data arrangement specifying information 922.

The client function implementation means 61 issues a command execution request (update request) to the identified data node (Step S103).

The client function implementation means 61 waits for a response notification from the data node that is the update request issuing source, and an update request confirms that it is held in the respective data nodes (Step S104).

As a result of Step S102, in the case of Read processing, the flow proceeds to Step S105.

In step S105, the client function implementation means 61 identifies (recognizes) processing content characteristics (Step S105).

Next, on the basis of the identified processing characteristics and other system conditions thereof, the client function implementation means 61 performs processing to select a data node that is to be accessed and issues a command request (Step S106).

The client function implementation means 61 thereafter receives an access processing result from the data node (Step S107).

The following gives a supplementary description concerning processing of Step S105 and Step S106. The client function implementation means 61 can comprehend types of data structure in which data to be accessed is held, from information stored in the data structure management information 921. For example, in the case of the example of FIG. 3A, when WORKERS table is accessed, the replica identifiers 0 and 1 have the data structure B, and the replica identifier 2 has the data structure C. It is to be noted that access to the WORKERS table is recorded by being associated with a replica identifier of the data node, in the access frequency information.

In the client function implementation means 61, determination is then made as to which data structure the data access performed on the data node is suited to, and the target data structure is selected. Specifically, for example in the case where in the client function implementation means 61, an SQL statement, which is an access request, is analyzed, and the sum of columns inside the table whose table identifier is "WORKERS" is accessed, the data structure C (column store) is selected. In the case where the SQL statement relates to access to extract a particular record, the client function implementation means 61 determines that the data structure B (row store) is suitable.

In the case of a command extracting a particular record, the client function implementation means 61, for replica identifiers 0 and 1, may select either thereof. It is to be noted that for "the case where it is not necessary to perform processing with the latest data", it is desirable to use the replica identifier 1 for which the update trigger information is set to a large value.

An identification of this "the case where it is not necessary to perform processing with the latest data" is dependent on application context. Accordingly, a format explicitly specifying information that identifies data structure to be used or required data freshness (data newness) may be used in a command delivered to the client function implementation means 61.

After specifying a replica identifier (data structure) to be accessed, the client function implementation means 61 calculates a data node to be accessed. At this time, it is possible to enable change of selection of the access node according to the state of a distributed storage system. For example, when a certain table is stored in data nodes 1 and 2 with the same data structure B, in the case where access load of the data node 1 is large, a change may be made to an operation in which the client function implementation means 61 selects the data node 2.

When stored in the data node 3 with another data structure C, when the access load of the data node 3 is relatively small in comparison with the data nodes 1 and 2, the client function implementation means 61 may be configured to issue an access request to the data node 3 (data structure C), even if access content to be processed is more suited to data structure B.

In the client function implementation means 61, an access request is issued to the data node calculated/selected in this way (S106), and an access processing result is received from the data node (S107).

<Operation of Data Node>

Figure 11:
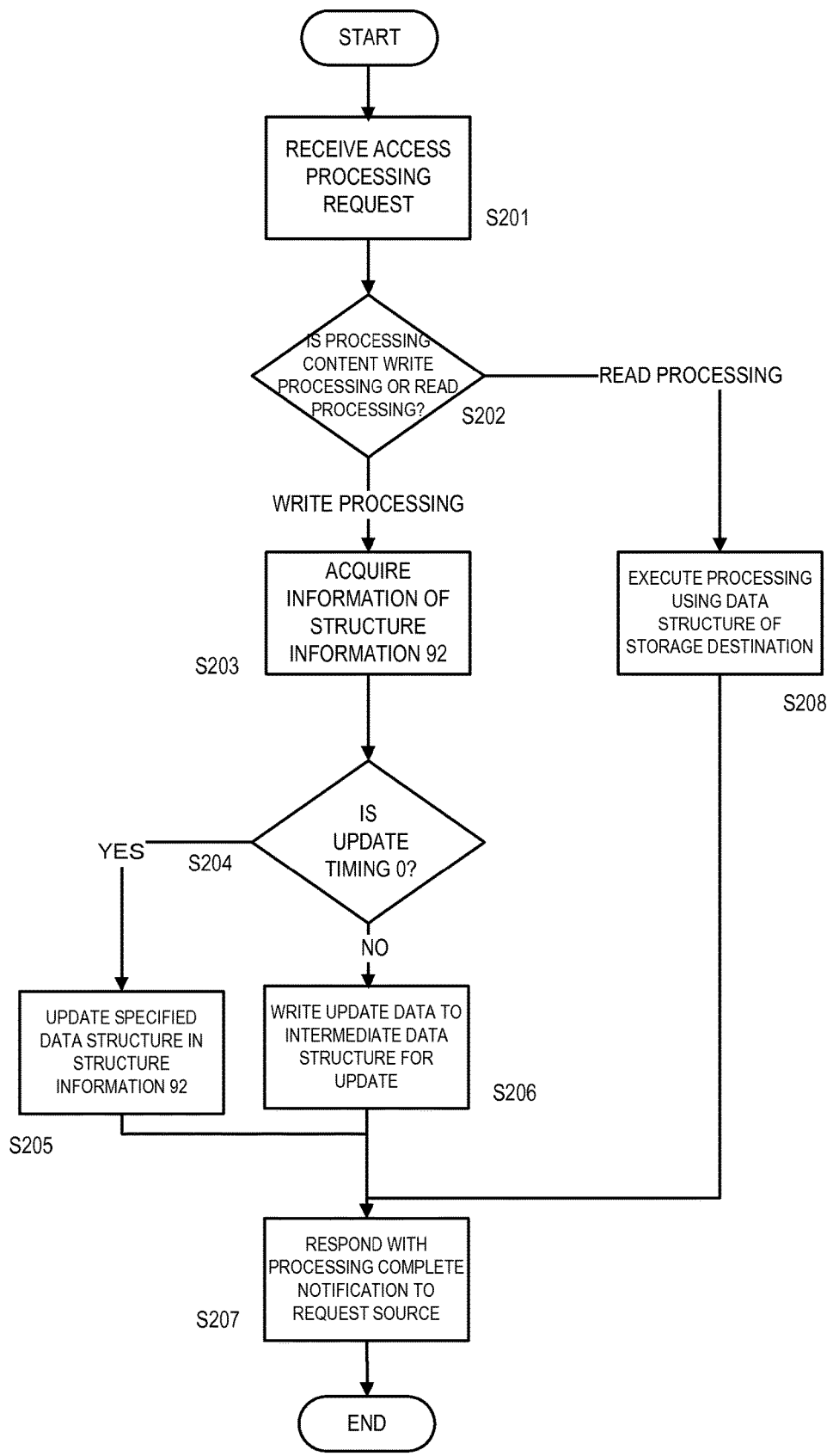
FIG. 11 is a flowchart illustrating an access processing operation in a data node in an exemplary embodiment of the invention.

FIG. 11 is a flowchart illustrating access processing in the data node of FIG. 2. The following describes the operation of the data node in detail with reference to FIG. 11 and FIG. 2.

First, the access receiving means 111 of the data management and processing means 11 of the data node receives an access processing request (Step S201 in FIG. 11).

Next, the access receiving means 111 of the data management and processing means 11 of the data node determines whether content of the received processing request is Write processing or is Read processing (Step S202).

As a result of Step S202, in the case of Write processing, the access processing means 112 of the data management and processing means 11 of the data node acquires information with regard to the data structure management information 921 in the structure information holding unit 92 (Step S203). Acquiring information with regard to the data structure management information 921 may be performed by accessing master data, or by accessing cache data in an arbitrary location (data of a cache memory storing a replica of some master data), or the client function implementation means 61 of FIG. 1 may give information (access to master data or cache data) for a request issued to a data node, and in the access processing means 112, this information may be used for access.

Next, the access processing means 112 determines whether or not an update trigger for processing with respect to the data node in question is "0" (zero), from information of the data structure management information 921 (Step S204).

As a result of Step S204, when the update trigger is "0", the access processing means 112 directly updates the data structure specified in the structure information of the structure information holding unit 92 (Step S205). That is, the update data is converted to the specified data structure and is stored in the corresponding structure-specific data storage units 12X (X=1, 2, 3).

When the update trigger is not "0", the access processing means 112 stores the update data in a Write intermediate structure (structure-specific data storage unit 121) (Step S206).

In each of Steps S205 and 206, after processing completion, the access receiving means 111 responds with a processing completion notification to the client function implementation means 61 that is the source of the request (Step S207).

As a result of Step S202, in the case of Read processing of data, execution of Read processing is performed (Step S208).

Regarding an executing scheme of a Read processing, the following three representative methods may be cited, though not limited thereto.

(1) In a first method, processing uses data of a data storage unit of a data structure specified in the data structure management information 921. This has the best performance, but in the case where a time period of an update trigger (cycle) is long, there is a possibility that data held in a Write intermediate structure will not be reflected in the Read processing. Therefore there is a possibility of an inconsistency occurring in the data. However, there is no particular problem in the case of usage where an application developer recognizes this situation in advance, or in the case where it is known that after writing, data reading will not occur within a time period of the update trigger, or where new data access is necessary, access to replica identifier data with an update trigger of "0" is determined.

(2) A second method is a method where processing is performed after waiting for application of conversion processing separately performed. Implementation thereof is easy, but response performance deteriorates. There is no problem in the case of an application that is not demanding in response performance.

(3) In a third method, processing reads both a data structure specified in the data structure management information 921, and data held in the Write intermediate structure. In this case, a response with the latest data can always be given, but performance deteriorates in comparison with the first method.

Any of the abovementioned first to third methods may be used. Furthermore, it is also possible to specify, which method to execute, in a processing command that is issued by the client function implementation means 61, realizes a plurality of types and that is described as a configuration file in the system.

<Data Structure Conversion Operation of Data Structure Conversion Means>

Figure 12:
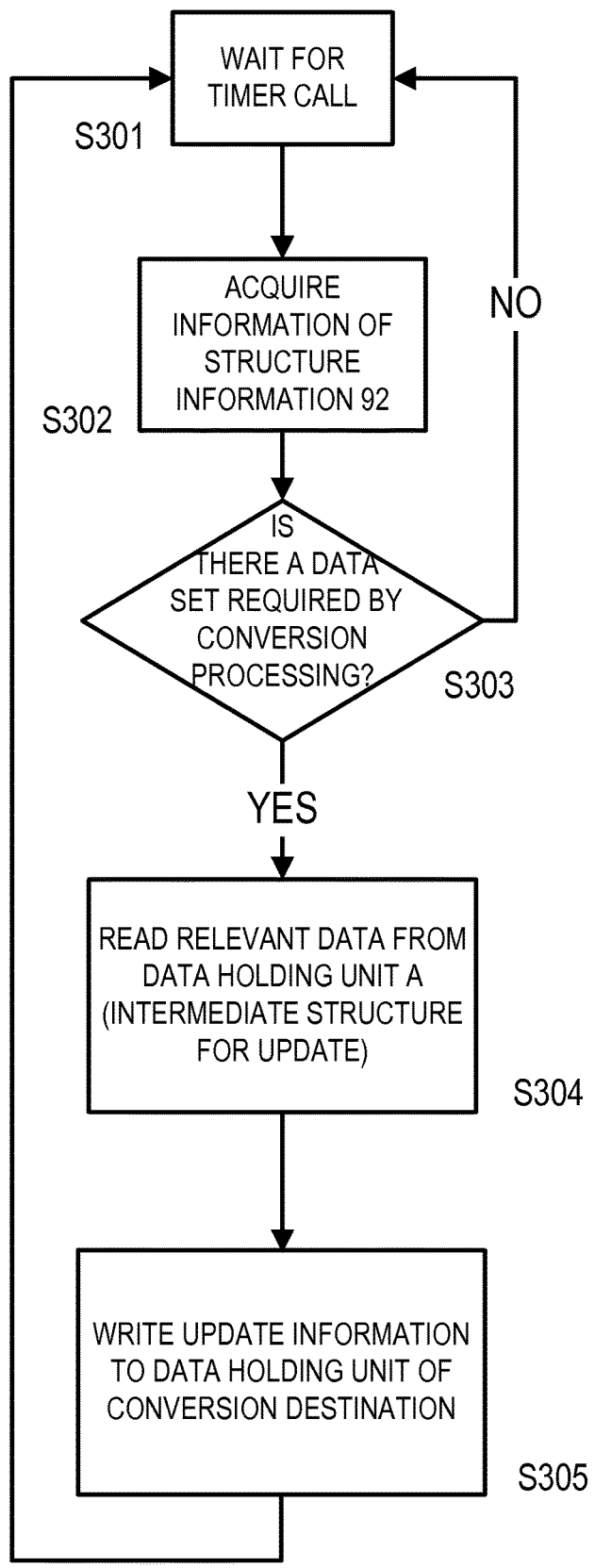
FIG. 12 is a flowchart illustrating data conversion processing in an exemplary embodiment of the invention.

FIG. 12 is a flowchart illustrating an operation of data conversion processing in the data structure conversion means 113 of FIG. 2. The following describes data conversion processing, with reference to FIG. 12 and FIG. 2.

In order to determine whether or not periodic conversion processing is necessary, the data structure conversion means 113 waits for a call by a timeout occurrence in a timer (not shown in the drawings) provided in a data node (Step S301 in FIG. 12). It is to be noted that the timer may be provided inside the data structure conversion means 113 as a dedicated timer. The timeout period of the timer corresponds to a setting value of update trigger information (second) in FIG. 3A (timeout period of Aync (timer) in FIG. 6).

Next, the data structure conversion means 113 obtains structure information (data information) of the structure information holding unit 92 (Step S302), and makes a determination as to whether or not there is a data structure requiring conversion (Step S303). For example, when a determination is performed every 10 seconds by the timer, a data structure for which the update trigger is 20 seconds is subjected to conversion processing every 20 seconds, so that at a 10 second point in time, conversion processing need not be performed. In the case where conversion processing is not necessary, control returns to timer call waiting (waiting until there is a call by a timeout occurrence in the timer) (Step S301).

On the other hand, when conversion processing is necessary, update processing content for data to be converted is read from an intermediate data structure for updating (Step S304), and processing to reflect the update information in the structure-specific data storage unit 12X (X=1 to 3) that is a conversion destination, is performed (Step S305).

<Write Sequence 1>

Figure 13:
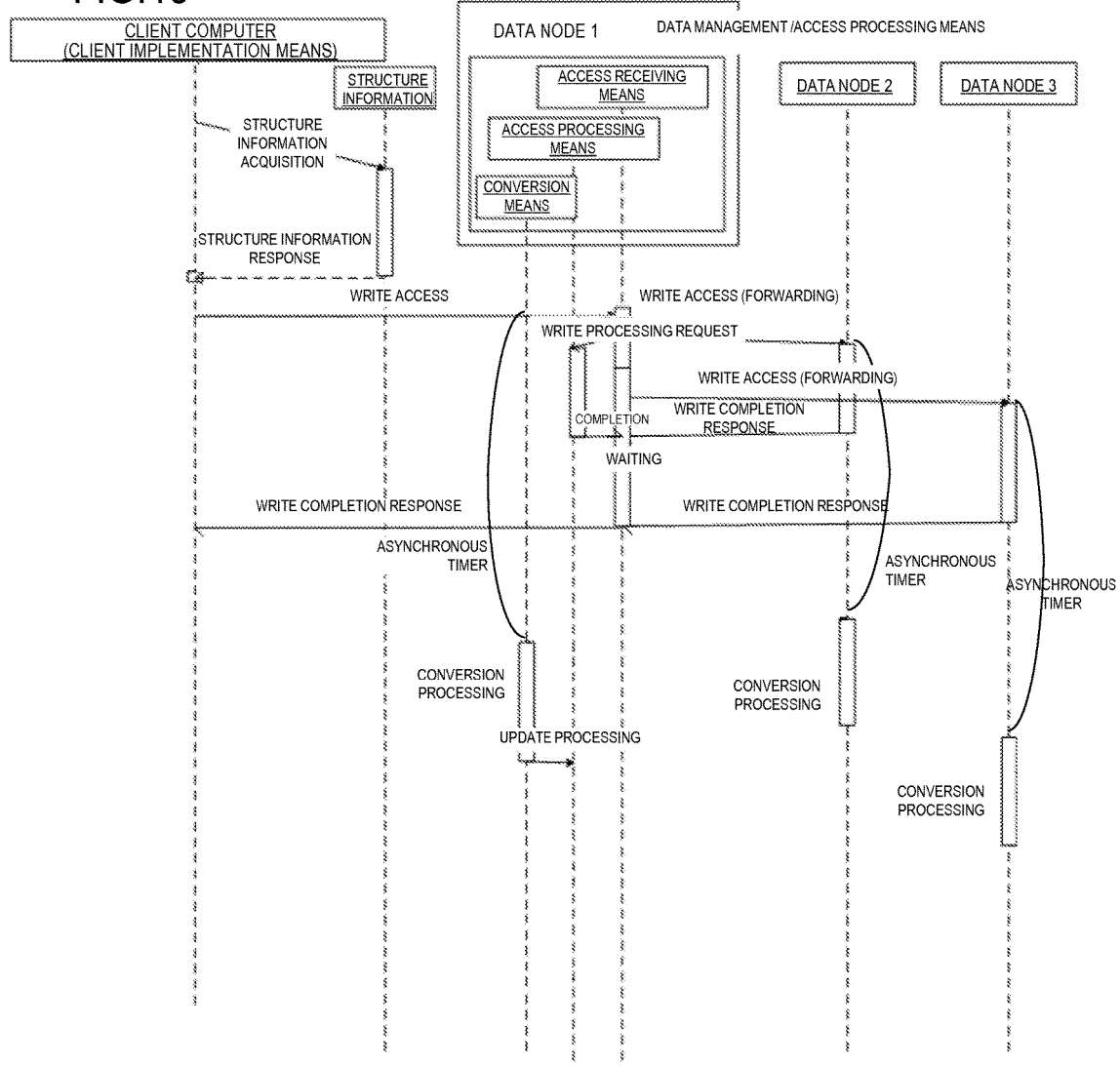
FIG. 13 is a first diagram illustrating an operation sequence in Write processing in an exemplary embodiment of the invention.

FIG. 13 is a diagram illustrating a sequence of Write processing (processing accompanying data updating).

The client function implementation means 61 (client computer) of a client node 6 acquires information of the data arrangement specifying information 922 (FIG. 2) held in the structure information holding unit 92 of the structure information management means 9 (or acquires information from cache memory at an arbitrary location).

A client computer uses the acquired information to issue a Write access command to a data node (data node 1 of replica identifier 0) that is an arrangement destination of data for which Write processing is to be performed.

The access receiving means 111 of the data node 1 receives a Write access request, and forwards the Write access to the data nodes 2 and 3 specified by the replica identifiers 1 and 2. As a method of identifying the data nodes of the replica identifiers 1 and 2, the data node 1 may access the structure information holding unit 92 (or a suitable cache), or a part or all of information of the data structure management information 921 together with the Write access command issued by the client function implementation means 61 may be delivered.

The access processing means 112 of each data node performs processing of the received Write access request.

The access processing means 112 refers to information of the data structure management information 921 to execute the Write processing.

In the case where the value of the update trigger information is greater than "0", the Write processing content is stored in the structure-specific data storage unit 121 of data structure A.

In the case where the value of the update trigger information is "0", storing is performed to the structure-specific data storage unit 12X of a data structure specified in the data structure management information 921.

After completion of Write processing, the access processing means 112 issues a completion notification to the access receiving means 111 and returns a completion response to the client computer.

The data nodes (2, 3) at a replica destination return a Write completion response to the access receiving means 111 of the data node 1 that is a replica source.

The access receiving means 111 waits for a completion notification from the access processing means 112 of the data node 1, and a completion notification of the data nodes 2 and 3 of respective replica destinations, and after receiving all of these completion notifications, returns a response to the client computer.

The data structure conversion means 113 (refer to FIG. 2) of the data node 1 converts and stores data stored in the Write intermediate structure (structure-specific data storage unit 121 (data structure A)) to the structure-specific data storage units 12X (final storage destination data structure, specified in the data structure management information 921) in response to a timeout of an asynchronous timer. Similarly the data nodes 2 and 3 also perform conversion to a target data structure in response to a timeout of an asynchronous timer.

<Write Sequence 2>

Figure 14:
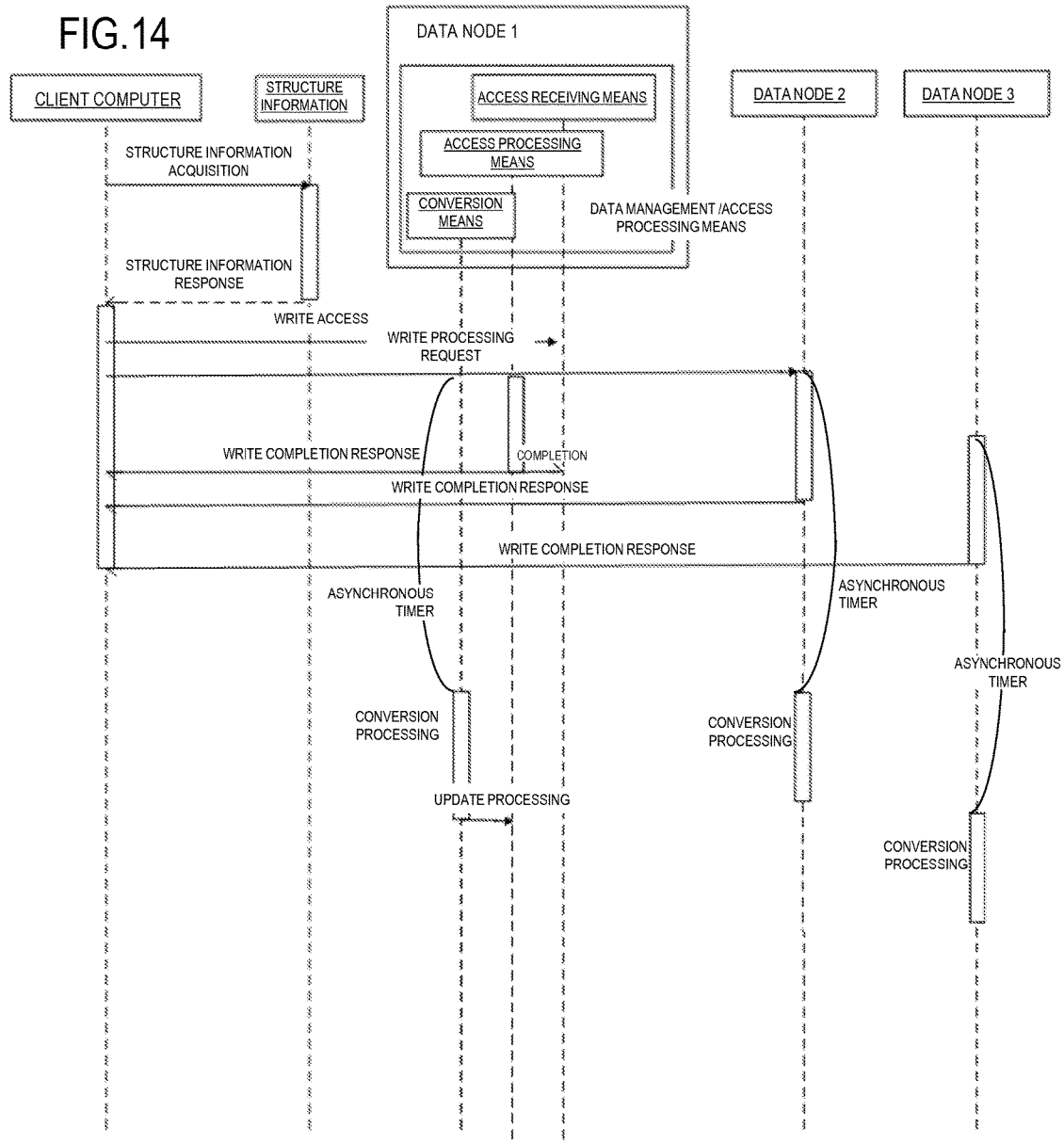
FIG. 14 is a second diagram illustrating an operation sequence in Write processing in an exemplary embodiment of the invention.

It is to be noted that in the example of FIG. 13, the data node 1 forwards a Write request to the data nodes 2 and 3 that are replica destinations, but as shown in FIG. 14, the client computer may issue a Write command to all the data nodes that are storage destinations.

The example of FIG. 14, as compared with FIG. 13, differs in that waiting for a Write access request is carried out by the client computer. In the example of FIG. 14, the client computer issues a Write request to each of the data nodes 0, 1 and 2 that are storage destinations, and receives completion responses from each of the data nodes 0, 1 and 2 that are storage destinations.

<Variation Example>

Figure 15:
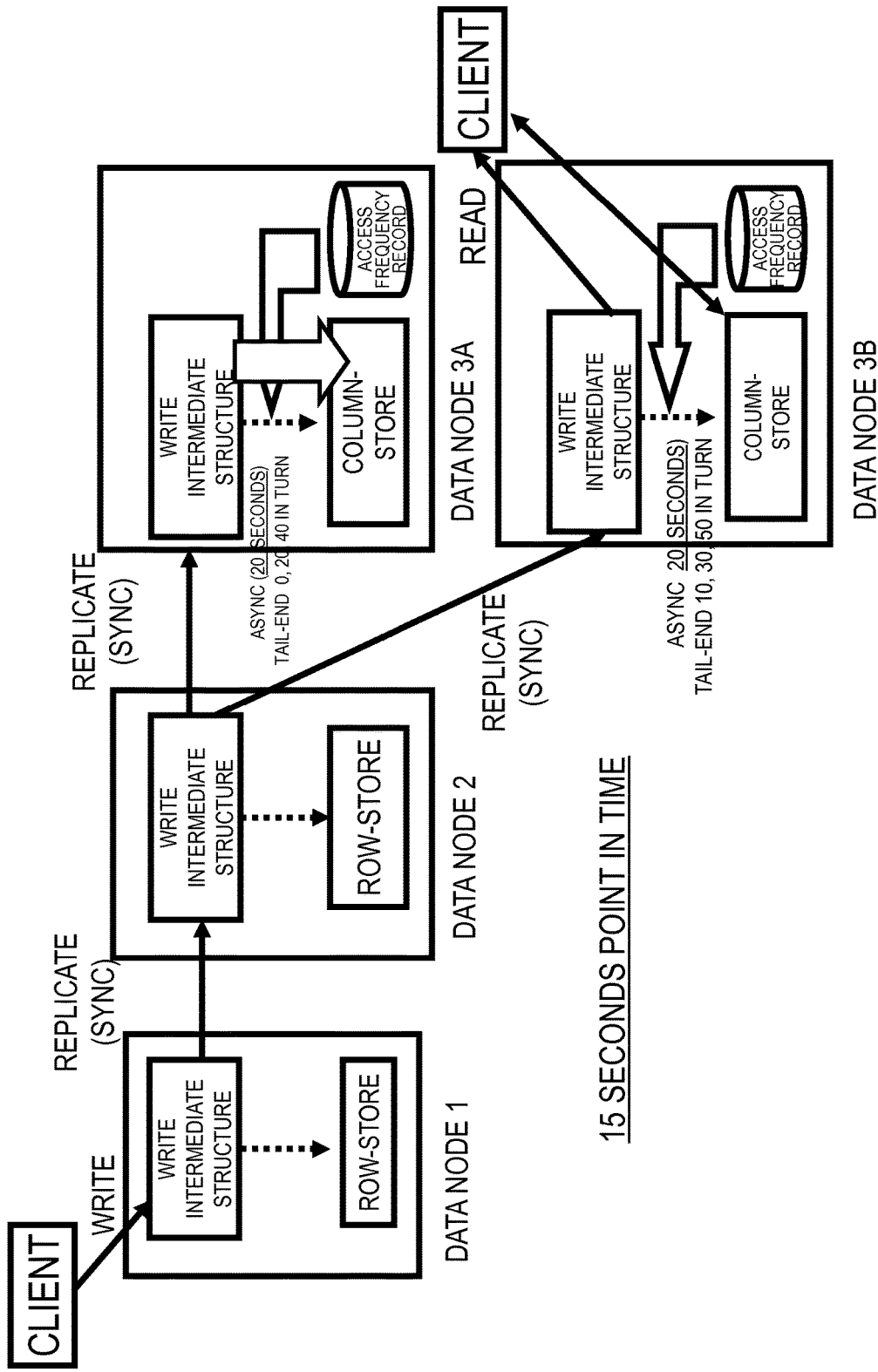
FIG. 15 is a diagram illustrating another exemplary embodiment of the present invention.

FIG. 15 is a diagram illustrating a variation example of the configuration of FIG. 8. Referring to FIG. 15, data node 3 in a Column Store format of FIG. 8 is configured by 2 data nodes 3A and 3B, and in the case of performing conversion to a data structure of a Column Store format from a Write intermediate structure by one data nodes 3A, a client of an analysis system performs analysis by referring to data of the other data node 3B (pre-conversion data stored in the Write intermediate structure and data already converted to the Column Store format). A setting of an asynchronous timer in the data nodes 3A and 3B is 20 seconds (Aync (20 seconds)) but conversion of the data structure in the data node 3B is delayed by 10 seconds compared to the conversion of the data structure by the data node 3A. For example, in the data node 3A, conversion of a data structure is performed in a time interval of 0 to 20 seconds, and data analysis is performed by a client performing Read access in a subsequent 20 to 40 second time interval. In the data node 3B, analysis of data is performed by the client performing Read access in a 10 to 30 second time interval, and conversion of data structure is performed in a subsequent time interval of 30 to 50 seconds. Therefore, at a 15 second point in time between 10 seconds and 20 seconds, for example, conversion of data structure is performed in the data node 3A and analysis of the data is performed in the data node 3B. It is to be noted that setting of an asynchronous timer in the data nodes 3A and 3B is done based on access history information (access frequency) of the data nodes 3A and 3B.

<Another Variation Example>

Figure 16:
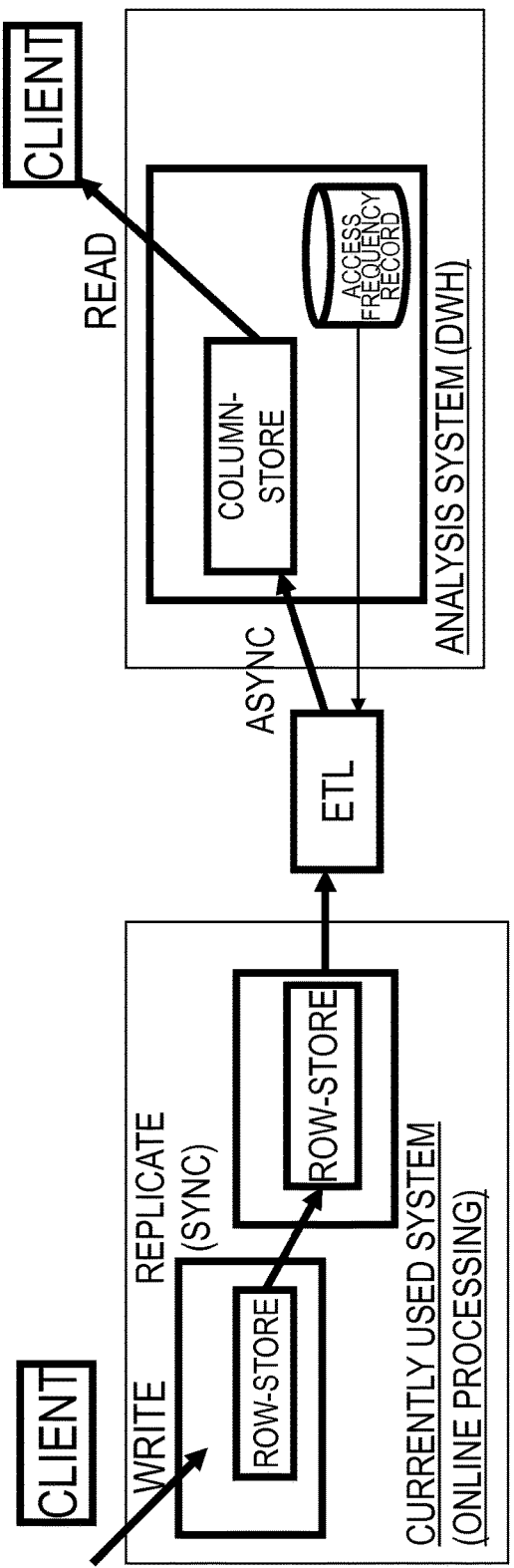
FIG. 16 is a diagram illustrating a further exemplary embodiment of the present invention.

FIG. 16 illustrates an example in which ETL (Extract/Transform/Load) is arranged between an online processing (an online processing system that performs Write processing) and an analysis system (data warehouse) performed in batch processing or the like.

Data warehouse systems include a large scale database for extracting data (such as transaction data, for example) from a backbone system, performing reconfiguration, information analysis, and for decision making. There is a need to perform data migration from a database of a backbone system to a data warehouse/database, and this processing is called ETL (Extract/Transform/Load). It is to be noted that "Extract" represents extracting data from an information source of a unit, "Transform" represents conversion and processing the extracted data in accordance with business needs, and "Load" represents loading already converted and processed data to a final target (that is, a data warehouse). In FIG. 16, the abovementioned exemplary embodiment is applied to ETL data conversion. That is, asynchronous data conversion performed by ETL in FIG. 16 corresponds to conversion of a data structure by the data structure conversion means 113 of FIG. 1.

In the example of FIG. 16, ETL converts data (replication data) in a Row Store format of a currently used system (online processing) asynchronously (Asynch) to a Column Store format for an analysis system (data warehouse). In the present exemplary embodiment, by adjusting, based on access frequency, a timer that asynchronously performs conversion in ETL, based on access history information (access frequency information), it is possible to eliminate a bottleneck in data structure conversion and to improve usage efficiency of storage.

It is to be noted that the respective disclosures of the abovementioned patent literature are hereby incorporated by reference into this specification. Modifications and adjustments of exemplary embodiments and examples are possible within the bounds of the entire disclosure (including the scope of the claims) of the present invention and also based on fundamental technological concepts thereof. Furthermore, various combinations and selections of various disclosed elements (including respective elements of the respective claims, respective elements of the respective exemplary embodiments, and respective elements of the respective drawings) are possible within the scope of the claims of the present invention. That is, the present invention clearly includes every type of transformation and change that a person skilled in the art can realize according to the entire disclosure including the scope of the claims and to technological concepts thereof.

What is claimed is:

1. A distributed storage system comprising:
a plurality of data nodes connected in a network, each data node including a data storage unit, each data node configured for converting a data structure of data to be updated to a target data structure and store the data having data structure converted to the target data structure in the storage unit thereof, the target data structure being suited to read access performed on the data node such that the data is able to be referenced with the target data structure as is by an application that uses the data with the target data structure, wherein, in response to an update request of the data, the data node corresponding to a replication destination of the data, stores the data to be updated temporarily in an intermediate structure for holding write data, the data node performs conversion of the data to be updated stored in the intermediate structure to the target data structure asynchronously with respect to the update request received, based on a trigger information that prescribes a timer value as from reception of the data to be updated and held in the intermediate structure to the conversion to the target data structure, to store the resulting data structure in the data storage unit thereof;

an access history recording unit configured for storing history of frequency of access to the data node; and a unit configured for changing the trigger information based on access history information recorded in the access history recording unit.

2. The distributed storage system according to claim 1, wherein the data node corresponding to the replication destination stores the data to be updated in the intermediate structure to return a response, the data node, in response to an elapse of a time, prescribed by the trigger information, as from reception of the data to be updated, performing conversion of a data structure of the data to be updated held in the intermediate structure asynchronously to the target data structure to store the resulting data structure in the data storage unit thereof.

3. The distributed storage system according to claim 1, comprising a unit configured for controlling a data node at a data arrangement destination including the replication destination and a target data structure in the data node at the arrangement destination, on a per preset table basis, the data to be updated being converted and stored in the target data structure with a form of the preset table structure adapted to a form in which the application uses the data, in the data node at the data arrangement destination.

4. The distributed storage system according to claim 1, comprising:
a structure information management apparatus including a structure information holding unit that performs storage management of:
data structure management information including, in correspondence with a table identifier to identify data to be stored, a replica identifier to identify a replica;
data structure information to identify a type of data structure corresponding to the replica identifier; and
trigger information that is timer information of a time until the data being converted to a specified target data structure and stored, the number of information entries each including the table identifier, the replica identifier, the data structure information, and the trigger information corresponding to the number of types of the data structure associated with the table identifier, and data arrangement specifying information including, in correspondence with a table identifier, the replica identifier; and data node information of one or a plurality of data arrangement destinations corresponding to the replica identifier;

a client function implementation unit including a data access unit that refers to the data structure management information and the data arrangement specifying information to identify an access destination of update processing and read processing; and a plurality of the data nodes each including the data storage unit, the plurality of the data nodes being connected to the structure information management apparatus and the client function implementation unit, wherein the data node comprises a data management and processing unit including:

an access receiving and processing unit configured to hold data in an intermediate structure and to return a response to the client function implementation unit, when performing update processing, based on an access request from the client function implementation unit; and a data structure conversion unit configured to refer to the data structure management information and to perform processing of converting the data to be updated held in the intermediate structure to a target data structure specified by the data structure management information, in response to a specified update trigger.

5. The distributed storage system according to claim 4, comprising:

a change determination unit configured for determining whether or not to change the trigger information of the data structure management information in the structure information holding unit, by using access information recorded in the access history recording unit or other access information obtained by processing the access information, in the case where the change determination unit determines to change the trigger information of the data structure management information, the change determination unit giving notification to the structure information management apparatus, wherein the structure information management apparatus comprises a structure information change unit that on reception of the notification of change of the trigger information from the change determination unit, changes the trigger information of the data structure management information.

6. The distributed storage system according to claim 1, wherein the access information recorded in the access history recording unit includes frequency information on access to read from the data storage unit and access to write data to the intermediate structure.

7. The distributed storage system according to claim 5, wherein the access receiving and processing unit in the data node comprises:

an access receiving unit; and an access processing unit, wherein the data storage unit in the data node comprises a structure-specific storage unit, wherein the access receiving unit receives an update request from the client function implementation unit and forwards the update request to a specified data node corresponding to a replica identifier in the data arrangement specifying information, and further records an access request in the access history recording unit, and the access processing unit performs processing of the update request received, executes update processing with reference to information of the data structure management information, the access processing unit converting data structure of the data to be updated, when the trigger information regarding the data node is zero, based on information of the data structure management information to a target data structure specified in the data structure management information, to store the converted update data in the structure-specific data storage unit, the access processing unit, when the update trigger information is not zero, writing the data to be updated temporarily in the intermediate structure to make a response of processing-completion, the access receiving unit, on reception of the completion notification from the access processing unit, or a completion notification from the access processing unit and a completion notification from each data node of a replica destination, returning a response to the client function implementation unit, and wherein the data structure conversion unit converts data of the intermediate structure to a data structure specified in the data structure management information, and stores the converted data in the structure-specific data storage unit of a conversion destination.

8. The distributed storage system according to claim 1, wherein the plurality of data nodes includes at least two data nodes in which the target data structure is identical, the two data nodes, performing conversion from the data held in the intermediate structure for holding write data to the target data structure at respective timings that do not overlap, based on the trigger information set, when one of the two data nodes, converting the data held in the intermediate structure for holding write data to the target data structure, the other data node performing reading of data converted to the target data structure.

9. A data replication method for distributed storage including a plurality of data nodes connected in a network, each data node including a data storage unit, the method comprising:

in replication of data corresponding to an update request of data, the data node corresponding to a replication destination storing data to be updated temporarily in an intermediate structure for holding write data;

the data node performing conversion of the data to be updated in the intermediate structure to an associated target data structure asynchronously with respect to the update request received, based on a trigger information that prescribes a timer value from reception of the data to be updated and held in the intermediate structure to the conversion to the target data structure, to store the resulting data having data structure converted to the target data structure in the data storage unit thereof, the target data structure being suited to read access performed on the data node such that the data is able to be referenced with the target data structure as is by an application that uses the data with the target data structure; and changing the trigger information based on access history information of access to the data node.

10. The data replication method according to claim 9, comprising the data node corresponding to the replication destination storing the data to be updated in the intermediate structure to return a response, and the data node, in response to an elapse of a time, prescribed by the trigger information, as from reception of the data to be updated, performing conversion of a data structure of the data to be updated held in the intermediate structure asynchronously to the target data structure.

11. The data replication method according to claim 9, comprising controlling a data node at a data arrangement destination including the replication destination and a target data structure in the data node at the arrangement destination, on a per preset table basis, the data to be updated being converted and stored in the target data structure with a form of the preset table structure adapted to a form in which the application uses the data, in the data node at the data arrangement destination.

12. The data replication method according to claim 9, comprising:

storing in a structure information holding unit of a structure information management apparatus, data structure management information including, in correspondence with a table identifier to identify data to be stored, a replica identifier to identify a replica;

data structure information to identify a type of data structure corresponding to the replica identifier; and trigger information that is timer information of a time until the data being converted to a specified target data structure and stored, the number of information entries each including the table identifier, the replica identifier, the data structure information, and the trigger information corresponding to the number of types of the data structure associated with the table identifier, and data arrangement specifying information including, in correspondence with a table identifier, the replica identifier; and data node information of one or a plurality of data arrangement destinations corresponding to the replica identifier, a data access unit referring to the data structure management information and the data arrangement specifying information to identify an access destination of update processing and read processing; and the data node holding the data to be updated in an intermediate structure to return a response to the client function implementation unit, when performing update processing, based on an access request from the client; and the data node referring to the data structure management information and converting the data to be updated held in the intermediate structure to a data structure specified by the data structure management information, in response to a specified update trigger.

13. The data replication method according to claim 9, wherein the access history information comprises frequency information on access to read from the data storage unit and access to write data to the intermediate structure.

14. The data replication method according to claim 9, comprising:

preparing at least two identical data nodes in which the target data structure is identical;

the two data nodes, performing conversion from the data held in the intermediate structure for holding write data to the target data structure at respective timings that do not overlap, based on the trigger information set; and when one of the two data nodes, converting the data held in the intermediate structure for holding write data to the target data structure, the other data node performing reading of data converted to the target data structure.

15. The distributed storage system according to claim 1, wherein the data node corresponding to the replication destination, in response to an elapse of a time prescribed by the trigger information, converts the data stored in the intermediate structure to the target data structure of a row store form or a column store form on a per table basis.

16. The data replication method according to claim 9, comprising the data node corresponding to the replication destination converting, in response to an elapse of a time prescribed by the trigger information, the data stored in the intermediate structure to the target data structure of a row store form or a column store form on a per table basis.

* * * * *